(12) United States Patent
Endo

(10) Patent No.: US 7,098,461 B2
(45) Date of Patent: Aug. 29, 2006

(54) PHOTOELECTRIC CONVERSION DEVICE, RADIATION DETECTION APPARATUS, IMAGE PROCESSING SYSTEM AND DRIVING METHOD THEREOF

(75) Inventor: Tadao Endo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 10/987,004

(22) Filed: Nov. 15, 2004

(65) Prior Publication Data
US 2005/0061955 A1 Mar. 24, 2005

Related U.S. Application Data

(62) Division of application No. 09/911,616, filed on Jul. 25, 2001.

(30) Foreign Application Priority Data
Jul. 28, 2000 (JP) ............................. 2000-229696

(51) Int. Cl.
*G01T 1/24* (2006.01)
*H01J 40/14* (2006.01)

(52) U.S. Cl. ............................. 250/370.09; 250/370.11

(58) Field of Classification Search ........... 250/370.09, 250/370.11, 370.08
See application file for complete search history.

(56) References Cited

U.S. PATENT DOCUMENTS

| | | | |
|---|---|---|---|
| 4,359,759 A | 11/1982 | McBride et al. | 358/111 |
| 4,737,653 A | 4/1988 | Nakagawa et al. | 250/578 |
| 5,196,702 A * | 3/1993 | Tsuji et al. | 250/591 |
| 5,548,122 A | 8/1996 | Shoji | 250/370.09 |
| 5,777,335 A | 7/1998 | Mochizuki et al. | 250/370.09 |
| 5,811,790 A | 9/1998 | Endo et al. | 250/208.1 |
| 5,905,772 A | 5/1999 | Rutten et al. | 378/98.8 |
| 5,965,872 A | 10/1999 | Endo et al. | 250/208.1 |
| 6,127,684 A | 10/2000 | Kaifu | 250/370.09 |
| 6,160,260 A | 12/2000 | Yamayoshi et al. | 250/370.09 |
| 6,239,439 B1 | 5/2001 | Itabashi et al. | 250/370.11 |
| 6,326,625 B1 * | 12/2001 | Zur | 250/370.09 |
| 6,392,237 B1 | 5/2002 | Agano | 250/370.11 |
| 6,429,436 B1 | 8/2002 | Tomisaki et al. | 250/370.09 |
| 6,573,507 B1 | 6/2003 | Agano | 250/370.09 |
| 6,646,272 B1 * | 11/2003 | Rushbrooke et al. | 250/461.1 |

\* cited by examiner

*Primary Examiner*—Albert Gagliardi
(74) *Attorney, Agent, or Firm*—Fitzpatrick, Cella, Harper & Scinto

(57) ABSTRACT

In a photoelectric conversion device, in order to suppress alteration of its properties during a long time use, lower the decrease of the S/N ratio due to a dark current output, and shorten image-pickup cycles, MIS type photoelectric conversion elements using an amorphous semiconductor material are connected with an electric power source for applying bias for photoelectric conversion, an electric power for resetting an accumulated electric charge, and a setting point for applying zero bias at the time of non-operation of the element through a switch. Emitted x-rays from an x-ray source, which is a first light source, come into collision against phosphor after being transmitted through an object body to be inspected and then are absorbed in the phosphor to be converted into visible light rays. The visible light rays from the phosphor are radiated to the photoelectric conversion elements. Prior to reading out of the x-ray image, an LED light source is lighted. Switches are used for turning on the x-ray source and the LED light source. In this embodiment, there is a reading-out period and a non-reading-out period; the x-ray source is turned on during the reading-out period, and the LED light source is turned on during the non-reading-out period.

7 Claims, 19 Drawing Sheets

PHOTOELECTRIC CONVERSION DEVICE, RADIATION DETECTION APPARATUS, IMAGE PROCESSING SYSTEM AND DRIVING METHOD THEREOF

This application is a division of application Ser. No. 09/911,616, filed Jul. 25, 2001, the contents of which are incorporated by reference.

BACKGROUND OF THE INVENTION

1. Field of the Invention

The present invention relates to a photoelectric conversion device, particularly, a photoelectric conversion device for office appliances such as a copying machine, a facsimile, a scanner, or the like and a photoelectric conversion device to be used for an x-ray camera tube apparatus for medical use to be used for diagnosis or to be used for nondestructive inspection apparatus; an image processing (image information or image data processing) system; and their driving method.

2. Related Background Art

Conventionally, x-ray direct radiography has been carried out by a so-called film way, which has been a mainstream method carried out by radiating x-rays to a patient and transferring the transmitted x-rays to a photosensitive film through visible light conversion phosphors. The film way has problems that it takes a long time from photographing to developing processes and that it requires to store and search an immense number of photographed films in terms of maintenance and management in a hospital.

By the way, there is another way available using extremely bright phosphors in place of the film which is carried out by storing an x-ray image of a patient in the extremely bright phosphors, scanning the image with a laser beam thereafter, and reading the x-ray image as digital values. If an image is converted to be digital, that makes recording in a variety of media possible, so that image storage, search, and transfer can easily be carried out to improve the efficiency in a hospital in terms of the maintenance and management. Further, obtaining image data as digital values makes highly advanced image processing by a computer possible and is expected to result in improvement of diagnosis.

However, even the way using extremely bright phosphors has, as in the film way, a problem that it takes a long time from photographing to developing.

On the other hand, an x-ray imaging apparatus using a solid imaging (image-pickup) device such as CCD and an amorphous silicon semiconductor has been proposed. As in the film way, it is carried out by directly converting an x-ray image of a patient obtained through visible conversion type phosphors by x-ray radiation to a digital image, approximately in real time, by a large number of imaging (image-pickup) elements arranged in a two-dimensional array and reading the image. Since the digital image can be obtained approximately in real time, as compared with the above described film way and the way using the extremely bright phosphors, it is greatly advantageous. Especially, since amorphous silicon can be formed in a large surface area, in the case of an x-ray imaging apparatus using such amorphous silicon, photographing (image-pickup) of a large portion such as chest photography can be carried out in equal size. Consequently, a high light utilization factor is provided and a high S/N ratio is expected.

However, in an x-ray imaging apparatus for medical use, in order to photograph a chest of a human being in equal size, it is required to make available a solid imaging device with a large surface area as wide as 40 cm×40 cm and a number of pixels as extremely high as 5,000,000 to 10,000,000.

It is not so easy to produce the properties of these immense numbers of pixels all evenly and reliably. For example, in the case of using amorphous silicon for photoelectric conversion elements and switching elements for charge transfer, if continuous operation is carried out for a long duration, dark current of the photoelectric conversion elements will be increased and the properties of the switching elements will be changed. To deal with such cases, a countermeasure employed is that the photoelectric conversion elements and the switching elements are so designed as to be operated only at the time of taking images and so as to be inhibited from operation at the time of taking no image. For example, when no patient is in a photographing chamber, bias wires of the photoelectric conversion elements and gate wires and reading-out wires of the switching elements are biased to be at zero potential, and no electric field is applied to the insides of the amorphous elements to lower the property alteration of the elements in a long time use. However, this case has a complicated handling of operating the photoelectric conversion elements and switching elements after recognizing the presence of a patient near the imaging apparatus and then carrying out an image pickup operation. In other words, operability of the apparatus is deteriorated. A design to automatically recognize the existence of a patient may also be possible; however, it leads to an increase in cost of an apparatus.

On the other hand, in the case where a large number of photoelectric conversion elements with a large surface area is fabricated using an amorphous silicon thin film, there are problems that traces of impurities are mixed in fabrication processes and dangling bonds tend to be increased and that they form as defect levels. They work as trapping levels and become unnecessary dark current in the photoelectric conversion process to decrease the S/N ratio. As a driving method of a photoelectric conversion device in which the dark current is lessened, possible is a method of carrying out photoelectric conversion after the dark current is moderated by waiting for several to several 10 seconds from biasing the photoelectric conversion elements (and switching elements). However, if such a method is employed for an x-ray imaging apparatus, the cycle for taking images of a plurality of patients will become long.

As described above, in the photoelectric conversion device with a large surface area using amorphous silicon, it is made difficult to keep a high S/N ratio owing to the property alteration during a long time use and defect levels in a film and hence, a photoelectric conversion device and its driving method capable of being operated easily while keeping good S/N ratio have been expected to be developed.

SUMMARY OF THE INVENTION

An object of the present invention is to lower the property alteration during a long time use and the S/N ratio owing to dark current, shorten the imaging (image-pickup) cycles, and improve the operability of a photoelectric conversion device, an image data processing system and their driving method.

A photoelectric conversion device of the present invention in accordance with the above described objects is a photoelectric conversion device comprising: a photoelectric conversion substrate comprising a substrate and a plurality of photoelectric conversion elements arranged on the substrate;

a light source; and an outer casing for housing these members, wherein, between a reading-out period for obtaining image data (image information) and a non-reading-out period in which reading-out is not carried out, the light source is turned on in the non-reading-out period.

Also, the present invention provides a photoelectric conversion device comprising a substrate equipped with a plurality of photoelectric conversion elements for photoelectrically converting incident light rays having the image data and light sources for radiating light rays having the foregoing image data and light rays having no image data to a plurality of the foregoing photoelectric conversion elements.

Further, the present invention provides an image data processing system comprising: a photoelectric conversion device comprising a substrate equipped with a plurality of photoelectric conversion elements for photoelectric conversion of incident light rays having the image data and a light source for radiating light rays bearing no image data to a plurality of the foregoing photoelectric conversion elements, a radiation source, and control means for independently controlling the foregoing radiation source and the foregoing photoelectric conversion device.

Further, the present invention provides an driving method of an imaging (image-pickup) apparatus, comprising first and second light sources and a semiconductor element comprising a semiconductor layer having an absorption region of the wavelength of the light rays radiated from the foregoing second light source, wherein the image data is read out by radiating light from the foregoing first light sources during the imaging (image-pickup) period and radiation by the foregoing second light sources is carried out during the non-imaging period.

Furthermore, the present invention provides a radiation detection apparatus comprising: a photoelectric conversion substrate comprising photoelectric conversion elements arranged on a substrate and an outer casing for housing the photoelectric conversion substrate, wherein the radiation detection apparatus is further provided with a light source in the outer casing and is further provided with a wavelength converter for reflecting the light rays from the light source and entering the reflected rays in the foregoing photoelectric conversion elements.

DESCRIPTION OF THE PREFERRED EMBODIMENTS

Hereinafter, embodiments of the present invention will be described according to the drawings. The radiation used in the present invention includes x-rays, γ-rays, α-rays, β-rays, and the like.

Embodiment 1

Figure 1:
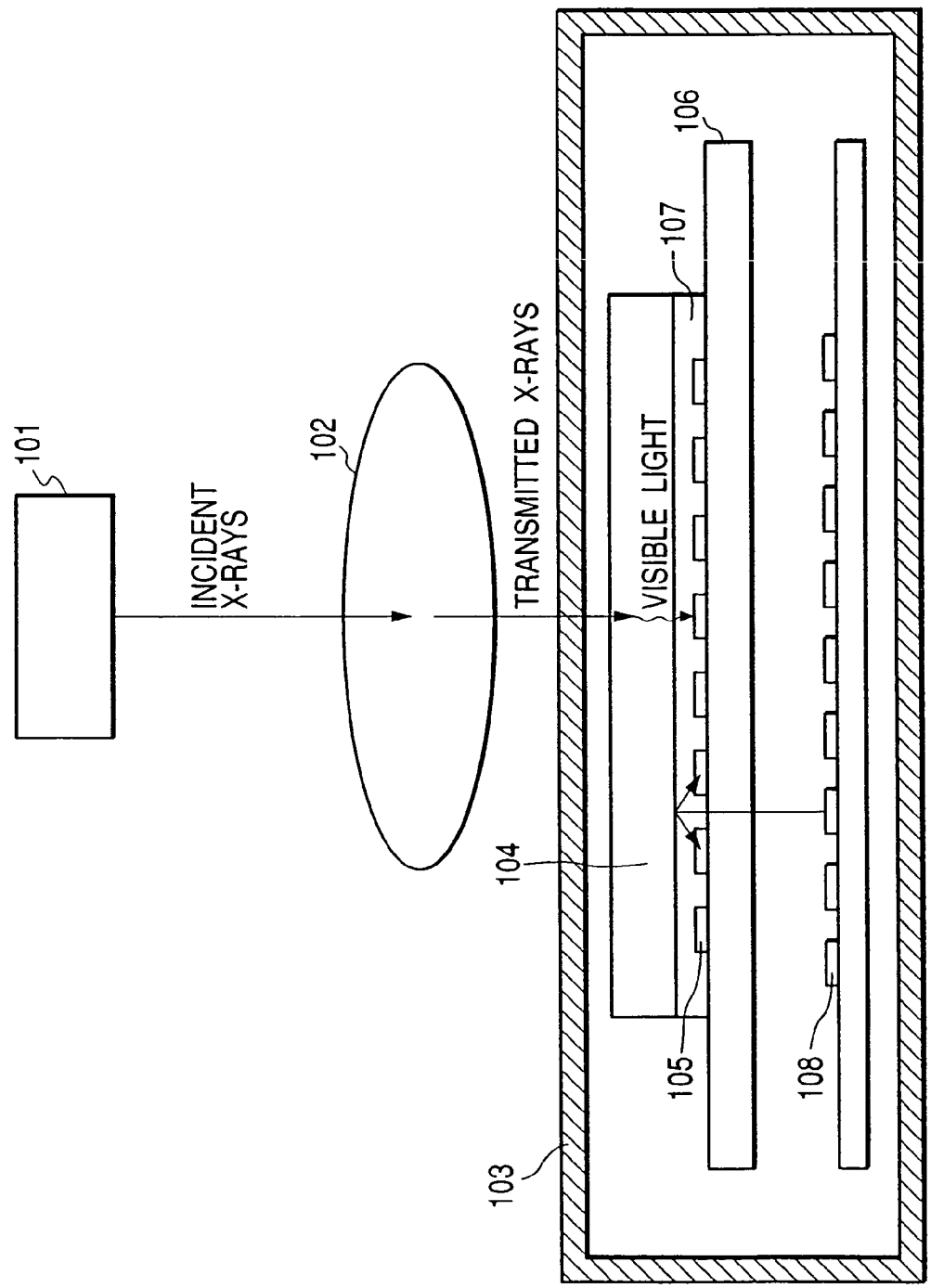
FIG. 1 is a cross-sectional view of a photoelectric conversion device of Embodiment 1 of the present invention.

FIG. 1 is a cross-sectional view of Embodiment 1 of a photoelectric conversion device according to the present invention. In the drawing, reference numeral 101 denotes a light ray source, 102 an object body to be read out, 103 a chassis, 104 a phosphor, 105 a photoelectric conversion element, 106 an insulating substrate, 107 a protective layer, and 108 an LED. This embodiment is performed by employing a photoelectric conversion device of the present invention for a radiation detection apparatus, especially, an x-ray imaging (image-pickup) apparatus.

In FIG. 1, the x-rays emitted out from the x-ray source 101 are radiated to the object body to be read out 102; the x-rays transmitted through the object body to be read out 102 reach the phosphors 104 and are converted into visible light rays by the phosphors 104. The visible light rays from the phosphors 104 are photoelectrically converted in light-receiving faces of photoelectric conversion elements 105 arranged on an insulating substrate 106. The photoelectric conversion elements 105 are covered with the protective film 107 for the purpose of improving moisture resistance.

As the materials for the insulating substrate 106, usable is mainly transparent glass with a little amount of alkaline components. The insulating substrate may be made of a plurality of insulating plates stuck to each other. Further, as the wavelength converter, phosphors are suitable to be used and as the materials for the phosphors, usable are $Gd_2O_2S$: Tb, CsI:Tl or the like.

On the other hand, the light rays (visible light rays) emitted from the LED 108 installed under the insulating substrate 106 are transmitted through the insulating substrate 106 and after passing the side faces of the photoelectric conversion elements 105, the light rays are reflected by the phosphors 104 and radiated to the light-receiving faces of the photoelectric conversion elements 105. The phosphors 104 have different reflecting characteristics of light rays from the LED 108 depending on the materials; however, any can be used unless the phosphors completely absorb light rays, and any that emits light rays of several % to the photoelectric conversion elements 105 may be usable.

In FIG. 1, the illustration is drawn as if the light rays from the LED 108 are perpendicularly radiated to the phosphors 104; however, some light rays enter from a diagonal direction and therefore, it is supposed that there are some components reflected by the phosphors 104 if those reflected by the mirror faces of the phosphor faces are included in the components.

In FIG. 1, the photoelectric conversion device of the present embodiment comprises the phosphors, the photoelectric conversion elements, LEDs or the like housed in an outer casing such as a chassis. The outer casing may be made of a material with extremely low x-ray absorption in the incident surface of x-rays, and metals such as aluminum, a stainless steel or the like are suitable to be used owing to the economical cost and the high strength.

If the x-ray imaging apparatus employing the above described photoelectric conversion device is for a medical use, the object body to be read out is a patient (human body) and if the x-ray imaging apparatus is for non-destructive inspection, the object body to be inspected may be parts used for, for example, aircrafts and ships.

Further, FIG. 1 shows a cross-sectional view of the photoelectric conversion device, in which the photoelectric conversion elements and LEDs are arranged in two dimensions in the depth direction of the surface of FIG. 1. Further, although omitted in FIG. 1, switching elements may be arranged while being coupled with the photoelectric conversion elements in pairs on the insulating substrate.

Figure 2:
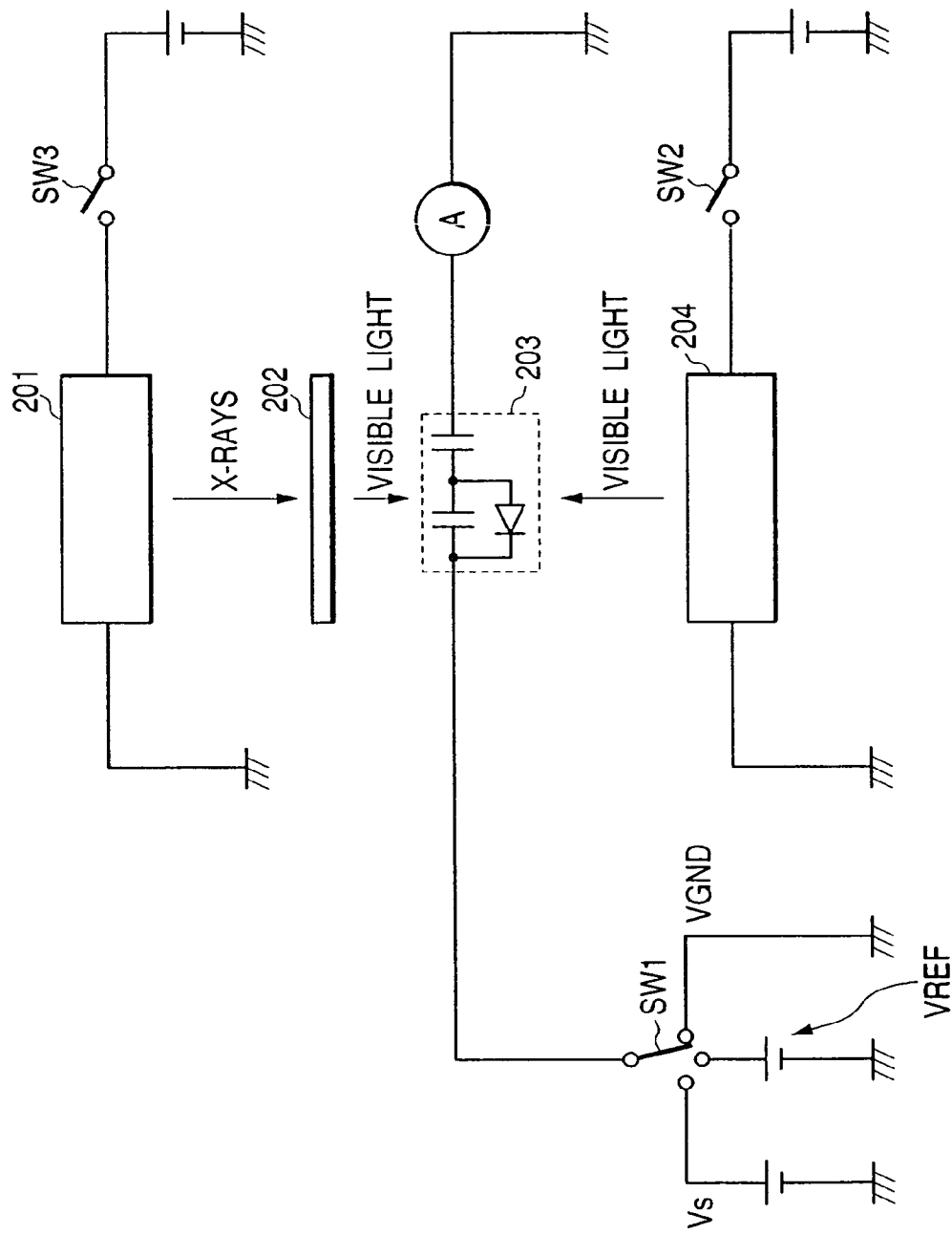
FIG. 2 is a diagram of a circuit using a photoelectric conversion element of Embodiment 1 of the present invention.

FIG. 2 is a diagram of a signal detection circuit of a single photoelectric conversion element to be employed for the photoelectric conversion device illustrated in FIG. 1. In the figure, the reference numeral 201 denotes an x-ray source, 202 a phosphor, 203 a photoelectric conversion element, and 204 an LED light source.

In FIG. 2, the photoelectric conversion element 203 is an MIS type photoelectric conversion element using an amorphous silicon semiconductor as a material. The MIS type photoelectric conversion element is constituted by stacking an insulating layer (insulator) and a semiconductor layer (semiconductor) on a lower part metal electrode layer (metal). Generally, an injection element layer (an n-type layer or a p-type layer) and an upper part electrode are arranged on the semiconductor layer. A detailed fabrication method and the operation principle of the MIS type photoelectric conversion element will be described later.

In FIG. 2, a power source for applying bias (Vs) for photoelectric conversion, a power source (VREF) for resetting accumulated charges in the capacity of the MIS type photoelectric conversion element, and a ground point (GND) for applying zero bias (VGND) when no photoelectric conversion element is operated are connected to the MIS type photoelectric conversion element through SW1.

The x-rays emitted from the x-ray source 201 which is a first light source are radiated to an object body, which is not illustrated in FIG. 2 (a patient in the case of a hospital), and the transmitted x-rays collide with a wavelength converter.

In FIG. 2, the x-rays are converted into visible light rays by the phosphor 202 which is a wavelength converter. The visible light rays from the phosphor 202 are radiated to the photoelectric conversion element 203. FIG. 2 shows an illustration only for one pixel, and the positioning correlation between the photoelectric conversion element 203 and the phosphor 202 is therefore not illustrated; however, as may be understood from FIG. 1, the image resolution property is improved by practically closely sticking both of them to each other. On the other hand, the visible light rays from the LED light source 204, which is a second light source, are radiated to the photoelectric conversion element 203 through another optical path different from the path for the x-rays. SW2 and SW3 are switches for turning on the x-ray source 201 and the LED light source 204, respectively.

Figure 3:
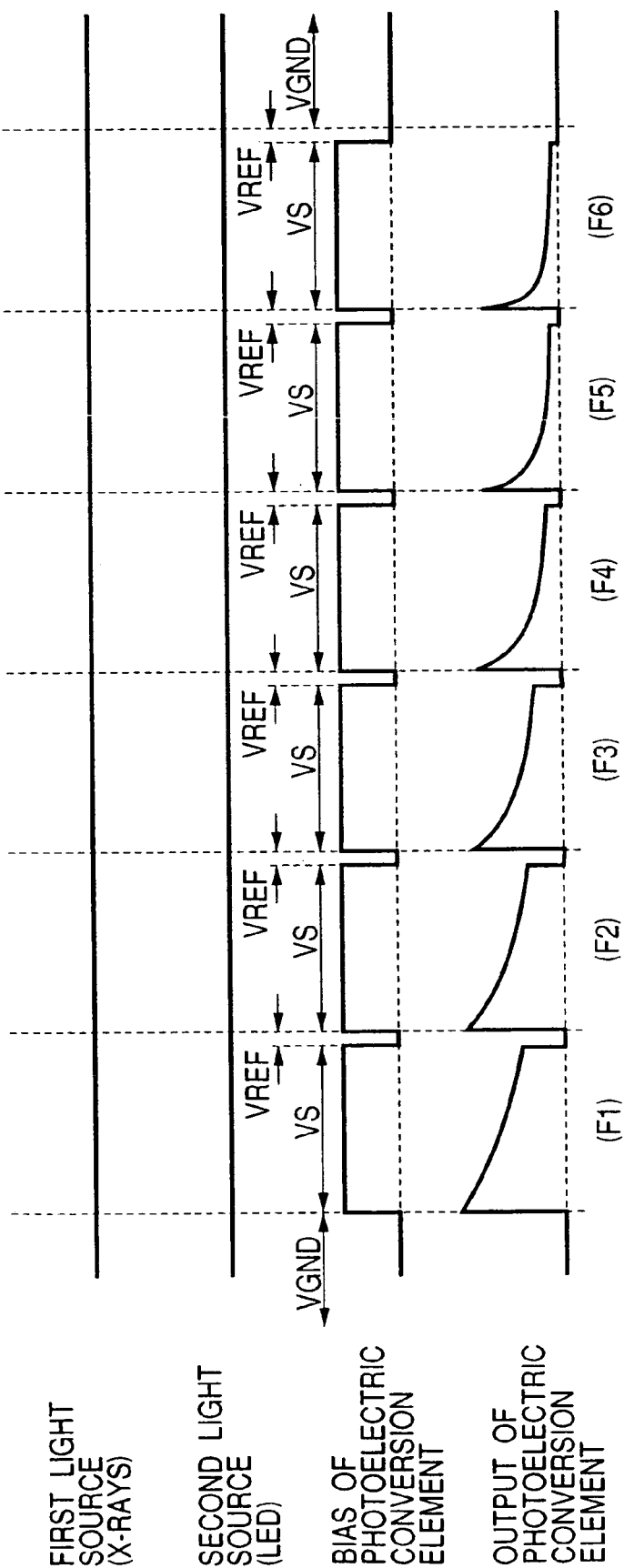
FIG. 3 is a timing chart (1) of the circuit illustrated in FIG. 2.

FIG. 3 is a timing chart of operation in the circuit shown in FIG. 2 and shows the x-ray source, the LED light source, bias of the photoelectric conversion element, and the output of the photoelectric conversion element.

In FIG. 3, the x-ray source and the LED are not turned on in order to show the state of dark output (dark current) of the photoelectric conversion element. FIG. 3 shows the time chart of 6 cycles of (F1) to (F6).

In the cycle (F1), when bias potential is applied to the photoelectric conversion element, the dark current flows. Ideally, it is preferable for the dark current to be zero; however, it is difficult to keep it zero. Further, a constant electric current does not flow simultaneously with the time when the electric power source is turned on, but it is high immediately after the turning on and gradually decays with the lapse of time.

As this cause, the following two are considered.

One is that in the case where photoelectric conversion elements are fabricated using an amorphous silicon semiconductor as a main material, defect levels are generally formed by dangling bonds in the amorphous semiconductor film and impurities mixed in the fabrication process. They work as trap levels and immediately after the electric power source is turned on or even before the source is turned on, they trap electrons or holes and are thermally excited to a conduction band or a valence band after several milliseconds to several ten seconds and thus conduction current (dark current) flows. It is said that many trap levels exist, especially in the interface portion between a semiconductor layer (an i-type layer) and an injection inhibiting layer (for example an n-type layer). In the case where crystal type MIS photoelectric conversion elements are employed without using amorphous semiconductor films, it is said that the trap levels are not so many as those in the case of using amorphous semiconductor films, although they depend on the fabrication process conditions and the apparatus to be fabricated. However, mismatches of crystal lattices are many in the interface portion between the semiconductor layer (an i-type layer) and the injection inhibiting layer (for example an n-type layer), and the trap level is not at zero. The photoelectric conversion elements tend to have an output of a photoelectric conversion element shown in FIG. 3.

The other cause is considered to be relevant to the property of the injection inhibiting layer. For example, in the case where the injection inhibiting layer is made of an n-type amorphous silicon, theoretically, holes are not injected to the semiconductor layer side. However, actually, particularly in the case of an amorphous layer, the n-type layer cannot completely block the holes. The holes injected to the semiconductor layer (i-type layer) through the n-type layer become dark current. The holes are accumulated in the interface between the semiconductor layer (i-type layer) and the insulating layer, and an internal electric field in the i-type layer is moderated along with the accumulation of the holes. Following the moderation of the electric field, the quantity of the holes injected from the n-type layer to the i-type layer is decreased, and therefore the dark current is decayed.

Signals with high S/N ratio can be obtained by waiting until the dark output of the photoelectric conversion elements shown in FIG. 3 is sufficiently decayed. However, it takes a long time, from several seconds to several ten seconds, until the dark output is decayed to an aiming level. In this case, for example, when the photoelectric conversion elements are employed for an x-ray imaging apparatus to be used in a hospital, the following procedure is required: a patient is guided to a photographing chamber, the photoelectric conversion elements are turned on, and after waiting for several to several ten seconds, the patient is subjected to x-ray exposure.

It is better to turn on the photoelectric conversion elements before a patient comes in the photographing chamber; however, in that case, deterioration (property change, corrosion, or the like) of the photoelectric conversion elements is accelerated, making it difficult to provide an apparatus with a long life.

In an MIS type photoelectric conversion element, no electron and no hole passes the internal insulating layer, and the generated carriers are accumulated in the interface between the semiconductor layer and the insulating layer. In the case where the bias (Vs) for photoelectric conversion shown in FIG. 2 is plus (+) bias, the accumulated carriers are holes and an n-type layer for inhibiting injection of the holes into the semiconductor layer is formed between the upper part electrode and the semiconductor layer. Electrons in equal quantity of the hole carriers accumulated in the interface between the semiconductor layer and the insulating layer are supplied from the GND to the electrode side where an ammeter is installed. The accumulated holes are either entirely or partially swept by controlling the bias of the sensor to VREF in a short time. Generally, the potential of the VREF is set lower than the potential of the VS. In the timing chart of FIG. 3, the potential of VREF is set to be the GND. In the cycle (F2), by applying the potential VS again, dark current similar to that in the cycle (F1) flows.

At that time, the dark current becomes low as compared with that in the cycle (F1). That is supposedly attributed to that carriers relevant to the dark current and collected in the trap levels existing in the i-type layer, especially in the periphery of the interface to the insulating layer, are lessened more in the cycle (F2) than in the cycle (F1). Further, it is also supposedly attributed to that the holes accumulated by the reset potential VREF of the cycle (F1) are not completely expelled and some remain in the semiconductor layer to consequently moderate the electric field in the inside of the semiconductor more in the cycle (F2) than in the cycle (F1).

In the same manner, as the cycles proceed from the cycle (F3) to the cycle (F6), the dark current is lowered and soon saturated. Nevertheless, although saturation takes place, since rush current flows at the time of switching the bias from the VREF to VS, the current value does not become a constant current value immediately after the switching. In the latter half, even in one cycle, especially, immediately before switching to VREF, the current becomes constant without change with the lapse of time. In order to surely keep as high an S/N ratio as an x-ray imaging apparatus, it is preferable that x-rays are radiated after the dark current is sufficiently reduced.

Figure 4:
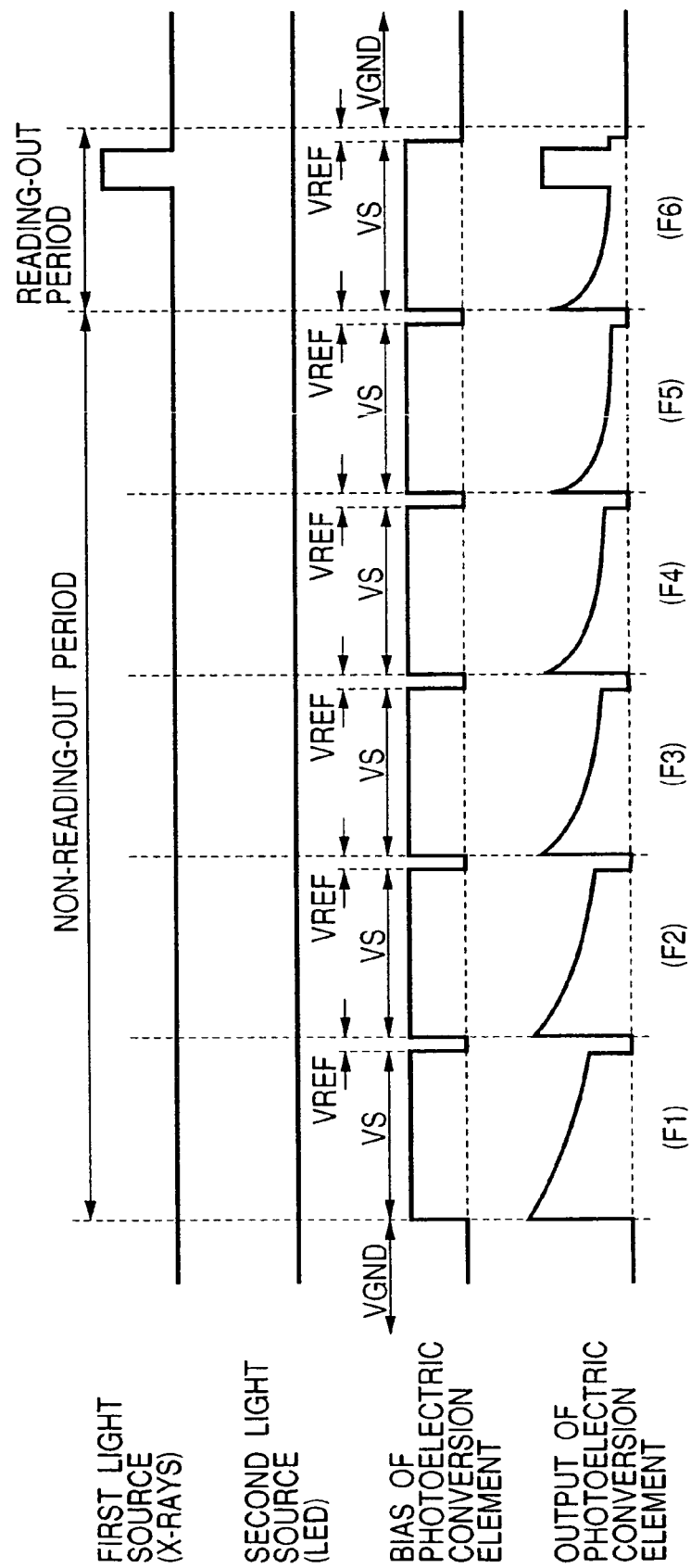
FIG. 4 is a timing chart (2) of the circuit illustrated in FIG. 2.

FIG. 4 is a timing chart obtained by radiating x-rays in the cycle (F6) after taking sufficient time. Since the properties of dark current in the cycle (F5) and in the cycle (F6) are approximately the same, the steady part overlaid on the current output by the x-rays in the cycle (F6) can easily be corrected by storing the output of the cycle (F5) in a memory and then subjecting the subtraction processing thereafter. Incidentally, the output of the cycle (F7), which is not illustrated in FIG. 4, may be used.

Although depending on the properties of the dark current of the photoelectric conversion elements and the operation conditions of the apparatus, the period of each cycle of (F1) to (F6) takes generally 0.1 to 3 seconds. Supposing it is 2 second/cycle, it takes 12 seconds for 6 cycles. In other words, from the time when bias is turned on, it takes 10 seconds or more until x-ray photographing is carried out.

Figure 5:
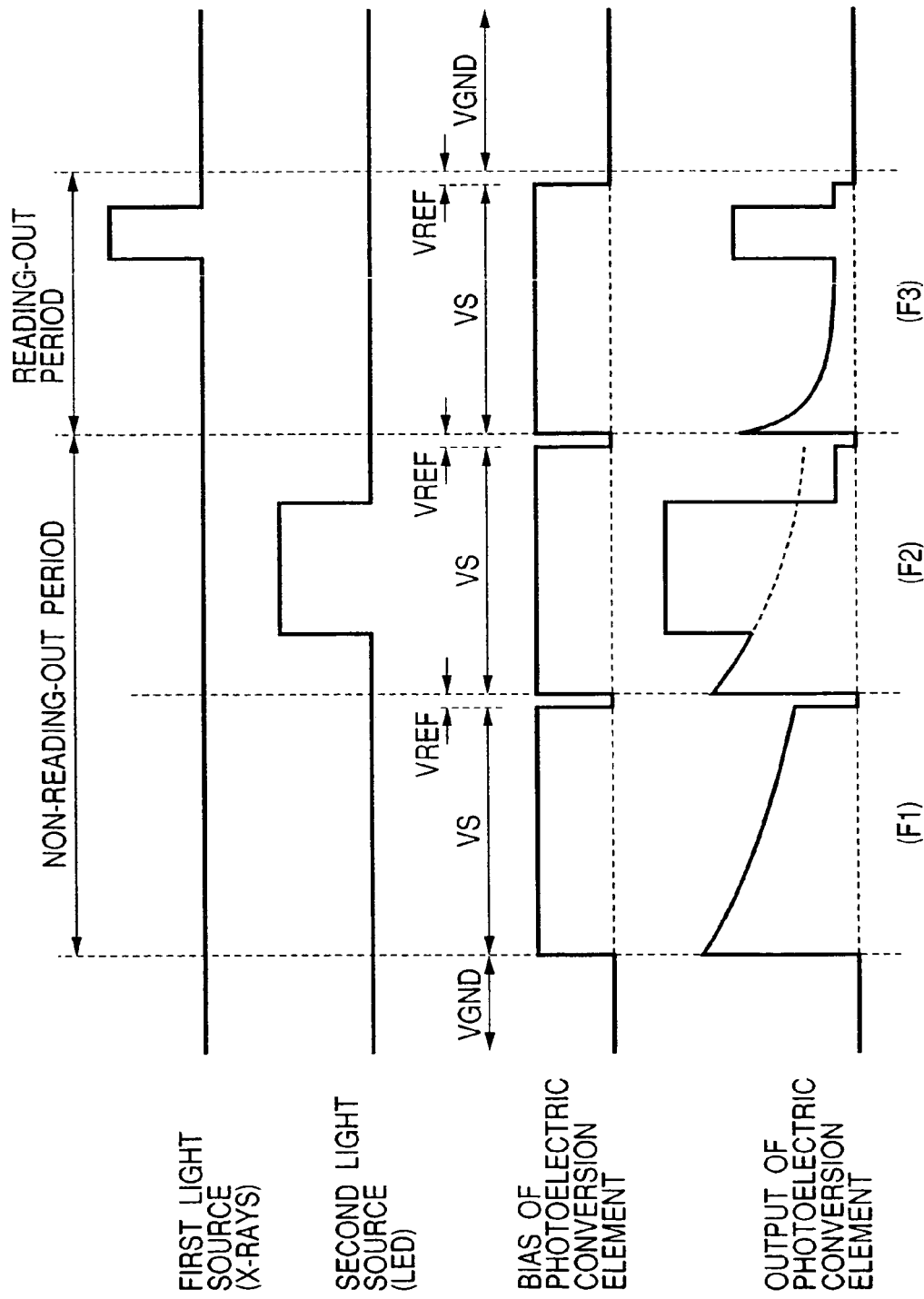
FIG. 5 is a timing chart (3) of the circuit illustrated in FIG. 2.

FIG. 5 is a timing chart obtained in the case of radiating x-rays and light rays from a light source.

During two operation periods, a reading-out period and a non-reading-out period, a first light source is turned on during the reading-out period, and a second light source is turned on during the non-reading out period. In the case of an x-ray imaging apparatus for medical use, the first light source is an x-ray source. In the case of a nondestructive inspection apparatus, the first light source is x-rays or another type of radiation. On the other hand, the second light source may be LED (light emitting diodes) and EL (electroluminescence), and any light source may be used as long as it has an electroluminescence wavelength in the wavelength region of light absorption of the photoelectric conversion elements.

The x-rays from the first light source, which is not illustrated, are the light rays to be radiated to an object to be photographed in order to obtain image data of the object (the object to be photographed). The light rays from the second light source are not necessary to be radiated to the object (the object to be photographed) and it is sufficient for the light rays to reach the photoelectric conversion elements through any optical path.

In FIG. 5, the LED (the second light source) is turned on in the cycle (F2) and the x-ray source (the first light source) is turned on in the cycle (F3). In the example shown in FIG. 5, the cycle (F1) and the cycle (F2) are the non-reading-out period and the cycle (F3) is the reading-out period.

The photocurrent flowing owing to the light radiation by the LED is not read as an image signal. That is, the LED is lighted during the non-reading-out period, the cycle (F2).

Although the photocurrent flows owing to the light radiation by the LED, simultaneously with the turning-off of the light, the state that dark current is flowing can be restored. However, after the LED is turned off, as shown in FIG. 5, lower and more stabilized dark output (dark current) flows than the dark output (the dashed line) of the case where light rays of the LED are not radiated in the cycle (F2).

That is attributed to that the photo energy of the LED is absorbed in the semiconductor layer, the generated carriers are accumulated in the interface with the insulating layer, the inner electric field in the semiconductor layer is moderated, and the carriers flowing therein from the injection inhibiting layer are consequently decreased. In the next cycle (F3), as shown in FIG. 5, since the generated carriers by the LED light rays of the cycle (F2) cause effects of operating several cycles in a dark state, the dark current is in a stable state. Further, it is also possible to be supposed that the previously trapped electrons or holes relevant to the dark current are decreased by the light radiation.

If x-rays are radiated in such a low dark current state, signals with a high S/N ratio can be obtained.

In other words, if the dark current is lowered by radiating LED light rays before x-ray image-pickup (photographing), an x-ray image with a high S/N ratio can be obtained without requiring a long time to wait.

The radiation duration and the intensity of the light rays in the cycle (F3) in FIG. 5 are optional as long as they lower the dark current and may be, for example, approximately the dark current after the cycle (F6) in FIG. 3. By radiating x-rays in the cycle (F3) of the reading-out period, signals with a high S/N ratio can be obtained. Although it is not illustrated in the figure, if the signals of the cycle (F4) are taken in and subtracted from the x-ray outputs of the cycle (F3), the fixed components in the dark current contained in the x-ray signals of the cycle (F3) can be corrected. As a result, if the dark current is lowered by radiating LED light rays before x-ray photographing, an x-ray image with a high S/N ratio can be obtained without requiring a long time to wait.

Although FIG. 5 is a timing chart where the cycle (F1) and the cycle (F2) are set to be the non-reading-out periods and the cycle (F3) is set to be the reading-out period, of course, it is also possible to radiate light rays by LED, which is the second light source, during the non-reading-out period in the cycle (F1) and to set the cycle (F2) to be the reading-out period. In that case, the time up to the x-ray radiation can further be shortened.

Figure 6:
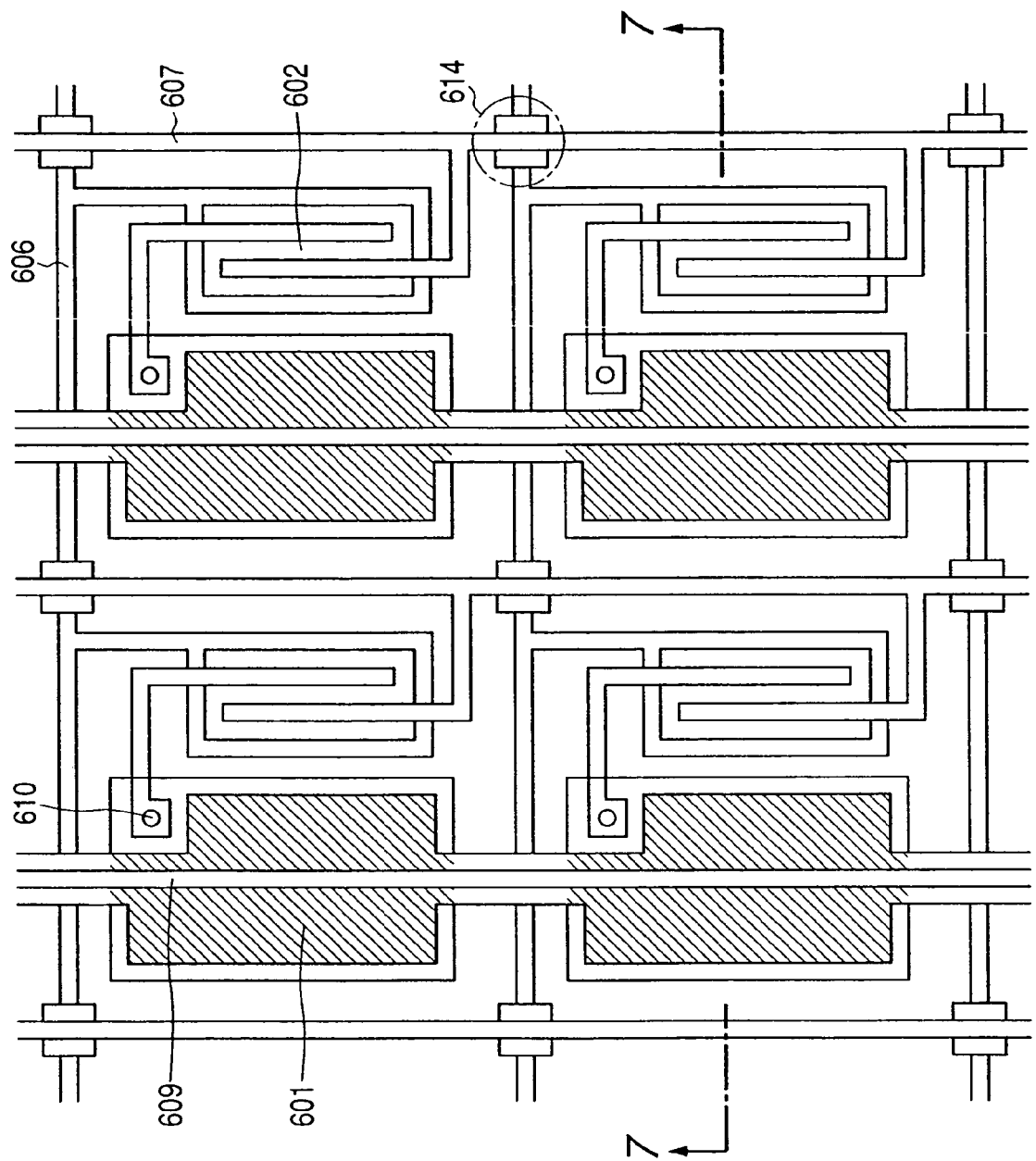
FIG. 6 is a plan view of a photoelectric conversion element and a switching element shown in FIG. 1.
Figure 7:
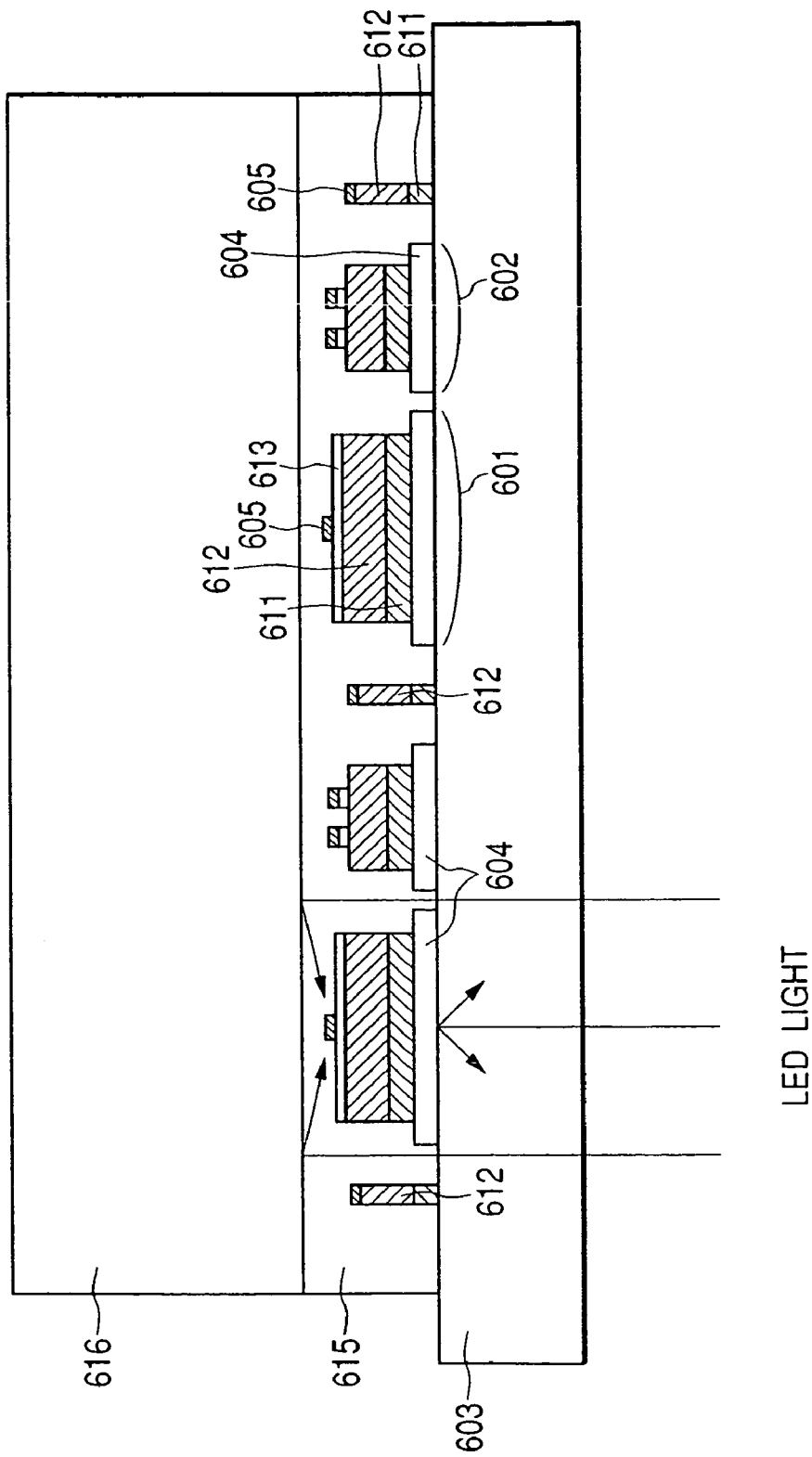
FIG. 7 is a cross-sectional view taken along the line 7—7 of FIG. 6.

FIG. 6 shows the plan view of a photoelectric conversion substrate constituted using amorphous silicon semiconductor thin films for the photoelectric conversion elements and switching elements arranged on an insulating substrate shown in FIG. 1, and the wirings bonding these elements are also illustrated together. FIG. 7 shows the cross-sectional view taken along the line 7—7 shown in FIG. 6.

In FIG. 6 and FIG. 7, the photoelectric conversion elements 601 and the switching elements 602 (amorphous silicon TFT, hereinafter referred as to "TFT") are formed on the same photoelectric conversion substrate (insulating substrate) 603. The lower part electrode which is the first electrode layer of the photoelectric conversion element 601 and the lower part electrode (gate electrode) of the TFT 602 are commonly made of the same first metal thin film layer 604. The upper part electrode which is the second electrode layer of the photoelectric conversion element 601 and the upper part electrode (source electrode and drain electrode) of the TFT 602 are commonly made of the same second thin film layer 605. Further, the first and the second metal thin film layers used for the electrode layers 604 and 605, respectively, are commonly used for the wiring 606 for gate operation and the matrix signal wiring 607 of the photoelectric conversion circuit, respectively.

In FIG. 6, the number of pixels is 2×2, 4 pixels in total. The hatching part shown in FIG. 6 is light-receiving faces of the photoelectric conversion elements 601. The reference numeral 609 denotes a power source line to apply bias to the photoelectric conversion elements. Further, the reference numeral 610 denotes a contact hole to connect a photoelectric conversion element 601 and the TFT 602. The light rays from the light source installed under the photoelectric conversion substrate 603 are led to the side of the phosphor 616 in the surrounding of the photoelectric conversion elements 601 from a region where the first metal thin film layer 604 and the second metal thin film layer 605 do not exist. Light rays are shielded by the first metal thin film layer 604 immediately under the photoelectric conversion element 601.

Next, the fabrication method for fabricating a circuit part of a photoelectric conversion device of this embodiment will be described.

FIG. 7 is a cross-sectional view taken along the line 7—7 shown in FIG. 6 showing the plan view of the photoelectric conversion substrate.

In FIG. 7, chromium (Cr) is deposited in a thickness of 50 nm as a first metal thin film layer 604 on an insulating substrate 603 by a sputtering method and a resistance heating method and patterned by photolithographic patterning, and the unnecessary areas are removed by etching. The first metal thin film layer 604 becomes a lower part electrode of a photoelectric conversion element 601 and a gate electrode of a switching element 602. Next, an a-SiN$_x$ layer (611), an a-Si:H layer (612) and an n$^+$-layer (613) are successively formed in 300 nm, 500 nm, and 100 nm film thickness, respectively, in the same vacuum atmosphere by a CVD method. The respective layers 611 to 613 are respectively an insulating layer, a photoelectric conversion semiconductor layer, and a hole injection inhibiting layer of a photoelectric conversion element 601 and respectively become a gate insulating film, a semiconductor layer, and an ohmic contact layer of a switching element 602 (TFT). They are also used as an insulating layer in a crossing part (614 in FIG. 6) of the first metal thin film layer 604 and the second metal thin film layer 605. The film thickness of each of the layers 611 to 613 is not restricted to the above described thicknesses and may be properly designed depending on the voltage and the electric charge employed for a photoelectric conversion device and the incident light intensity of the light-receiving faces of the photoelectric conversion elements. At least, the thickness of the a-SiN$_x$ layer 611 is preferably 50 nm or order to improve the moisture resistance, the respective elements and wirings are coated with a passivation film (protective film) 615 of SiN$_x$.

As described above, the photoelectric conversion device of this embodiment is produced only by depositing the first metal thin film layer, the a-SiNx layer, the a-Si:H layer, the n$^+$-layer and the second metal thin film layer on a whole plane, respectively, and etching the respective layers to commonly and simultaneously form the photoelectric conversion element, the switching TFT and the wirings.

In FIG. 7, a phosphor may be formed by directly depositing CsI on the protective film 615, or by, after GOS is formed in a sheet-like state in a separate process, sticking it using an adhesive.

By employing the above described processes using an amorphous silicon semiconductor as a main material, photoelectric conversion elements, switching elements, wiring for gate operation, and matrix signal wirings can be simultaneously formed on the same substrate and a large surface area photoelectric conversion circuit part can easily and economically be provided.

Figure 8:
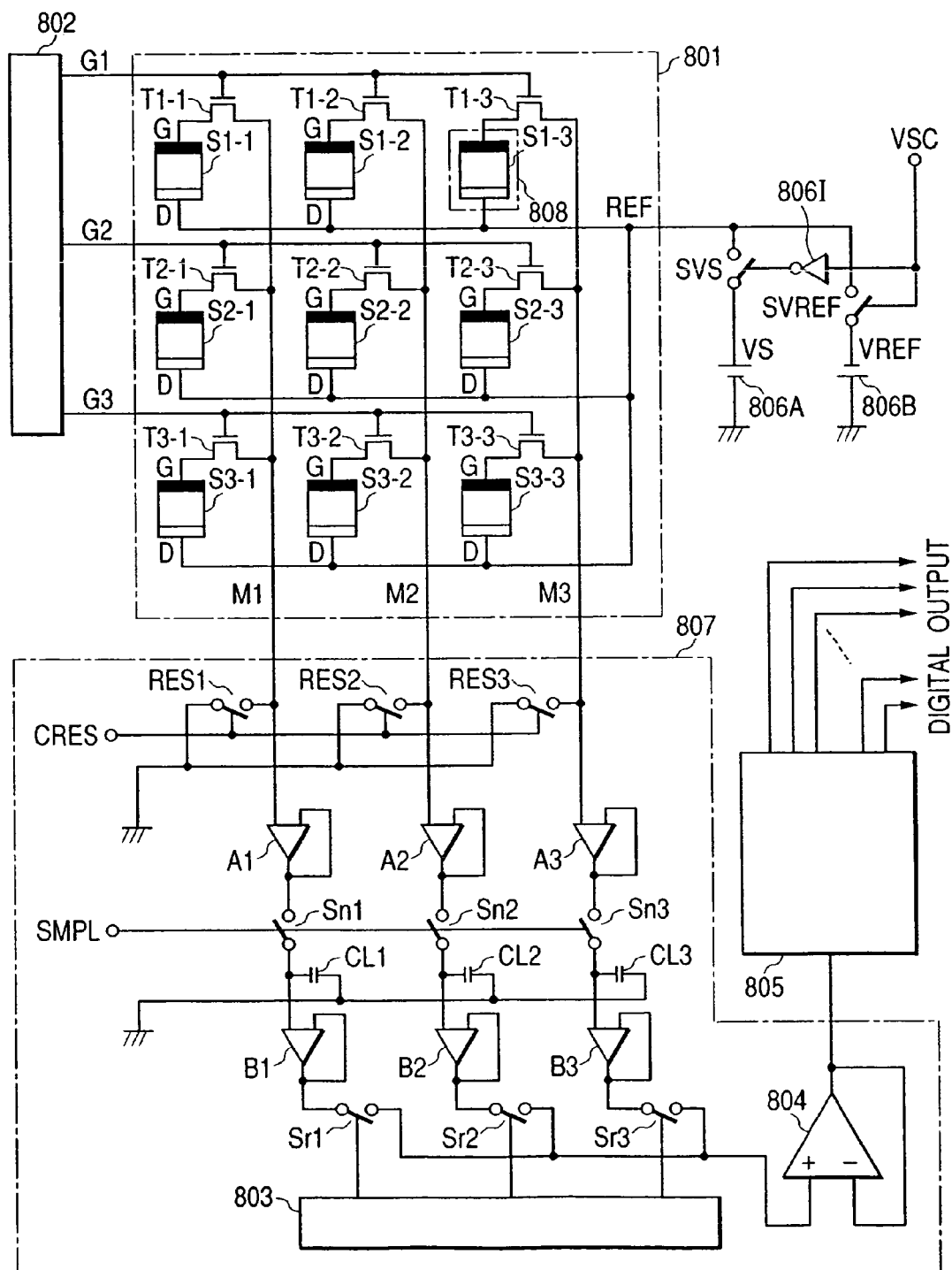
FIG. 8 is a diagram of a two-dimensional electric circuit of the photoelectric conversion device shown in FIG. 1.

FIG. 8 is a two-dimensional circuit diagram of the photoelectric conversion device illustrated in FIG. 1. In this circuit, only elements equivalent to 3×3=9 pixels are illustrated in order to simplify description. In the figure, the reference numeral 801 denotes a photoelectric conversion circuit part, 802 a shift register (SR1), 803 a shift register (SR2), 804 an operation amplifier, 805 an A/D conversion circuit, 806A and 806B are d.c. power sources, 806I a diode, 807 a circuit part for reading-out, and 808 a photoelectric conversion element.

The plan view and the cross-sectional view of the photoelectric conversion elements, the switching elements (TFT) and the like in FIG. 8 are the same as those shown in FIG. 6 and FIG. 7. A photoelectric conversion element has the same layer structure as that of the switching element and is composed as an MIS type capacitor. Incidentally, for the purpose of entering light rays in it, it is different from the normal MIS type capacitor in the point that an n$^+$-layer is used as an upper part electrode of the photoelectric conversion element. The photoelectric conversion element is a capacitor element as well and the signal charge generated by photoelectric conversion is accumulated in the capacity of itself.

Next, the description will be given regarding a method for carrying out operation such as accumulation of the charge of photoelectric conversion, transmission through the TFT, signal reading out, after completion of reset of a photoelectric conversion element, which is a capacitor, by using a bias circuit installed in the outer side, in this embodiment shown in FIGS. 1 to 8. Further, the reset operation of the above described photoelectric conversion element will be called as "refresh" hereafter. Incidentally, in FIG. 8, (S1-1) to (S3-3) are the above described photoelectric conversion elements, and "G" electrodes of the photoelectric conversion elements are the first metal thin film layer in FIG. 6, and "D" electrodes are the second metal thin film layer. Incidentally, as described above, the "D" electrodes as well as the $n^+$-layer function as electrodes in the photoelectric conversion elements (S1-1) to (S3-3).

Next, the device operation of a photoelectric conversion element as a single body will be described.

Figure 9A:
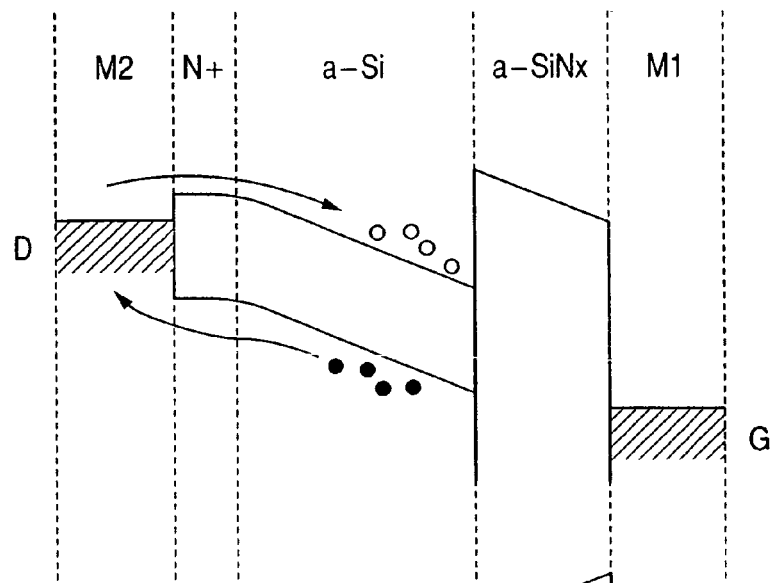
FIGS. 9A, 9B and 9C are band diagrams showing an operation of an MIS type photoelectric conversion element shown in FIG. 1.
Figure 9B:
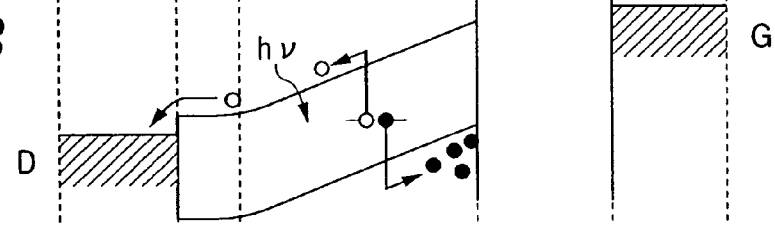
Figure 9C:
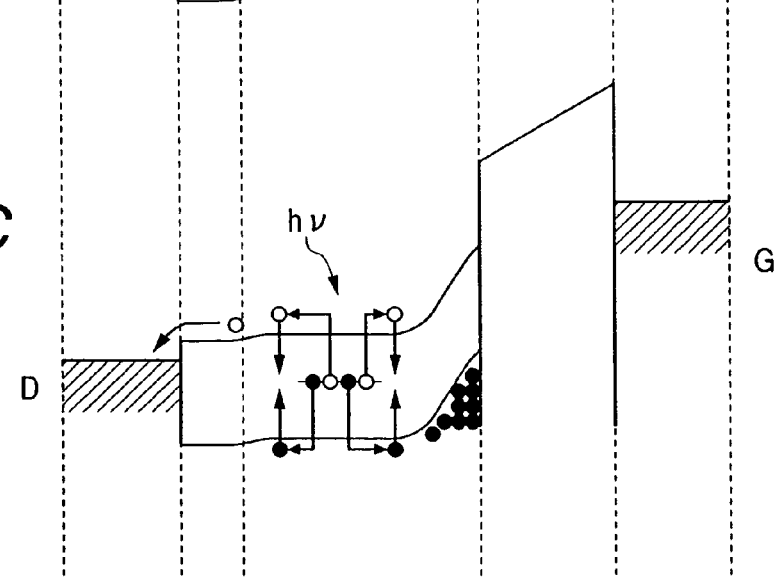

FIG. 9A to FIG. 9C show the energy band diagrams for illustrating the device operation of the photoelectric conversion element as a single body.

FIG. 9A and FIG. 9B illustrate the operation states in the refreshing mode and the photoelectric conversion mode, respectively, in this embodiment and show the states in the film thickness direction of the respective layers shown in FIG. 7.

The reference symbol M1 denotes the lower part electrode (the G electrode) of a first metal thin film layer (Cr). The a-SiN$_x$ layer is an insulating layer for inhibiting both of electrons and holes from passing through and is necessary to be thick enough not to cause the tunnel effect and is set to be 50 nm or thicker. The a-Si layer is a photoelectric conversion layer formed as an i-layer of an intrinsic semiconductor. The $n^+$-layer is an injection inhibiting layer of an n-type a-Si layer formed so as to inhibit injection of holes to the a-Si layer. Further, the reference symbol M2 denotes the upper part electrode (the D electrode) of a second metal thin film layer (Al).

Although the D electrode does not completely cover the $n^+$-layer in this embodiment, since the electrons are made to be freely transmitted between the D electrode and the $n^+$-layer, the D electrode and the $n^+$-layer are always kept at the same potential and in the following description that is presumed.

The photoelectric conversion element of this embodiment is provided with two types of modes, the refreshing mode and the photoelectric conversion mode, by the voltage application methods to the D electrode and the G electrode.

In FIG. 9A (refresh mode), negative potential is applied to the D electrode in relation to the G electrode, and holes denoted by a solid black circle (●) in an i-layer are led to the D electrode by an electric field. Simultaneously, electrons denoted by an open circle (○) are injected in the i-layer. At this time, a part of the holes and a part of the electrons are reconnected at $n^+$-layer and i-layer, respectively, and disappear. If such a state continues for a long enough time, the holes in the i-layer are swept out from the i-layer.

In order to convert the state (refreshing mode) shown in FIG. 9A to the state (photoelectric conversion mode) shown in FIG. 9B, positive potential is applied to the D electrode in relation to the G electrode. Consequently, electrons in the i-layer are led to the D electrode at once. However, holes are not led to the i-layer since the $n^+$-layer works as an injection inhibiting layer. In such a state, when light rays enter the i-layer, the light rays are absorbed and electron-hole pairs are generated. The electrons are led to the D electrode by an electric field and the holes move in the i-layer and reach the interface between the i-layer and the a-SiN$_x$ insulating layer. However, the holes cannot move to the insulating layer, and are accumulated in the i-layer. The electrons move to the D electrode and holes move to the interface with the insulating layer in the i-layer, so that current flows from the G electrode in order to keep the electrically neutral state in the photoelectric conversion element. The electric current corresponds to the electron-hole pairs and is proportional to the incident light rays.

When the operation state is changed again to the state of FIG. 9A which is a refreshing mode after keeping the state of FIG. 9B which is the photoelectric conversion mode, the holes accumulated in the i-layer are led to the D electrode as described above and simultaneously the current flows corresponding to the holes. The quantity of the holes corresponds to the total quantity of the light rays entering during the photoelectric conversion mode period. At that time, although electric current corresponds to the quantity of electrons injected to the i-layer, the quantity is approximately constant and therefore the detection may be carried out by subtracting the current by that extent. In other words, in this embodiment, the photoelectric conversion element outputs a quantity of incident light rays at real time and at the same time detects the total quantity of light rays which enter the photoelectric conversion element during a certain period.

However, in the case where the period of the photoelectric conversion mode is long or the illuminance of the incident light rays is intense because of some reasons, sometimes no current flows in spite of entering of the light rays. The cause for that is that, as shown in FIG. 9C, a large number of holes is accumulated in the i-layer and the electric field in the i-layer is reduced due to the holes, and the generated electrons are thus not led and subsequently re-coupled with the holes in the i-layer. When the incident light state is changed in such a state, electric current sometimes flows unsteadily; however, by changing to the refreshing mode again, the holes in the i-layer are swept and in the next photoelectric conversion mode, electric current in proportion to the light rays can flow again.

Further, in the above described description, when the holes are swept in the i-layer in the refreshing mode, it is ideal to sweep out all of the holes; however, an effect can be obtained even by sweeping only a part of the holes, and electric current equal to that in the case of entirely sweeping the holes can be obtained.

In other words, it is sufficient that the state at the time of the detection in the next photoelectric conversion mode is not the state shown in FIG. 9C, and the potential of the D electrode in relation to the G electrode in the refreshing mode and the period of the refreshing mode and the properties of the injection inhibiting layer of the $n^+$-layer may be determined so as to satisfy that. Further, in the refreshing mode, injection of the electrons in the i-layer is a dispensable condition and the potential of the D electrode in relation to the G electrode is not necessarily limited to be negative. This is because in the case where a large number of holes is accumulated in the i-layer, even if the potential of the D electrode in relation to the G electrode is a positive potential, the electric field in the i-layer is so generated as to lead the holes to the D electrode. Further, in the same manner, the properties of the injection inhibiting layer of the $n^+$-layer are not necessary to be able to inject electrons to the i-layer.

Next, the operation of the photoelectric conversion device of this embodiment will be described according to the above described FIG. 8 and FIG. 10.

Figure 10:
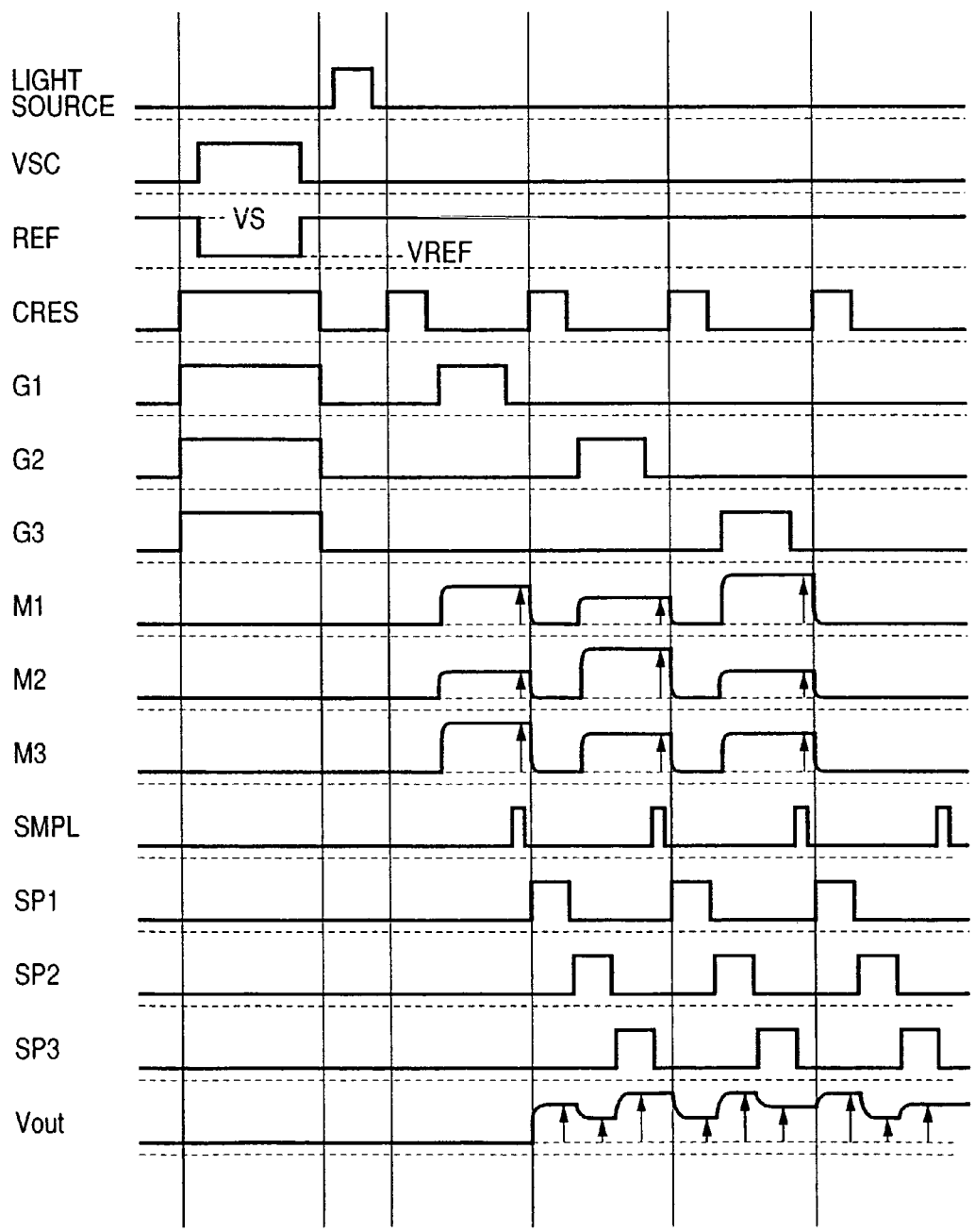
FIG. 10 is a timing chart showing an operation of FIG. 8.

FIG. 10 is a timing chart showing the operation of the photoelectric conversion device of FIG. 8.

In FIG. 10, the control signal VSC is for applying two types of bias to the bias line REF of a photoelectric conversion element, that is, the D electrode of the photoelectric conversion element. The D electrode is at VREF (V) when VSC is "Hi" and at VS (V) when VSC is "Lo". The reference numerals 106A and 106B denote d.c. power sources and they are a power source VS(V) for reading-out and a power source VREF (V) for refreshing, respectively.

At first, the operation during the refreshing period will be described.

The signals of the shift resistor 102 are all put in the "Hi" state to put the CRES signals of the circuit part for reading-out in the "Hi" state. Subsequently, all of the TFT (T1-1 to T3-3) for switching are electrically communicated and the switching elements RES1 to RES3 in the circuit for reading-out are also electrically communicated and the G electrodes of all of the photoelectric conversion elements are kept at GND potential. When the control signal VSC becomes "Hi", the D electrodes of all of the photoelectric conversion elements are put in biased state (at negative potential) by the power source VREF for refreshing. Consequently, all of the photoelectric conversion elements (S1-1) to (S3-3) are operated in the refreshing mode.

Next, the photoelectric conversion period will be described.

When the control signal VSC is switched to "Lo" state, the D electrodes of all of the photoelectric conversion elements are put in biased state (at positive potential) by the power source VS for reading-out. Subsequently, the photoelectric conversion elements are put in photoelectric conversion mode. In such a state, the entire signals of the shift registers 102 are put in "Lo" state and the CRES signals of the circuit part for reading-out are put in "Lo" state. Consequently, all of the TFT (T1-1 to T3-3) for switching are turned off and the switching elements RES1 to RES3 in the circuit for reading-out are also turned off and although the G electrodes of all of the photoelectric conversion elements are put in the open state in terms of d.c. current, the potential can be maintained since the photoelectric conversion elements work also as capacitors.

However, at that time, since no light rays enter the photoelectric conversion elements, no electric charge is generated. In other words, no current flows. In such a state, the light source is turned on by pulses (by a.c. current), light rays are radiated to the respective photoelectric conversion elements and so-called photocurrent flows. Regarding the light source, it is not particularly shown in FIG. 8, but in the case of a copying machine, for example, a fluorescent lamp, LED, a halogen lamp, or the like are employed. In the case of an x-ray imaging apparatus, it is of course an x-ray source, and a scintillator which becomes a wavelength converter for x-ray-visible light conversion may be employed. Further, semiconductors which are directly sensitive to the radiation, such as GaAs and a-Se, may be used. The photocurrent flowing by the light rays is accumulated in the form of electric charge in the respective photoelectric conversion elements and maintained even after the light source is turned off.

Regarding the reading-out period, the description is omitted since it is the same as described above.

After the refreshing period, the photoconversion period and the read-out period, one image can be obtained, and in the case of obtaining a plurality of images like a motion image, the above described operation may be repeated. In this embodiment, since the D electrodes of the photoelectric conversion elements are connected in common and controlled to be at the potential of the power source VREF for refreshing and at the potential of the power source VS for reading-out by controlling the common wiring by the control signals VSC, all of the photoelectric conversion elements can simultaneously be switched to the refreshing mode and the photoelectric conversion mode. Therefore, without requiring complicated control, light output can be obtained with one TFT for one pixel.

In this embodiment, it is made possible to shorten the time taken to lower the dark current by lighting the second light sources installed in the outer casing during the non-reading-out period. Further, especially in a radiation detection apparatus, the exposure duration of the radiation source is better to be shorter and separate installation of the second light sources in such a manner is effective to shorten the time taken to lower the dark current without prolonging the exposure duration of the radiation source and therefore it is preferable to employ the second light sources.

Embodiment 2

Figure 11:
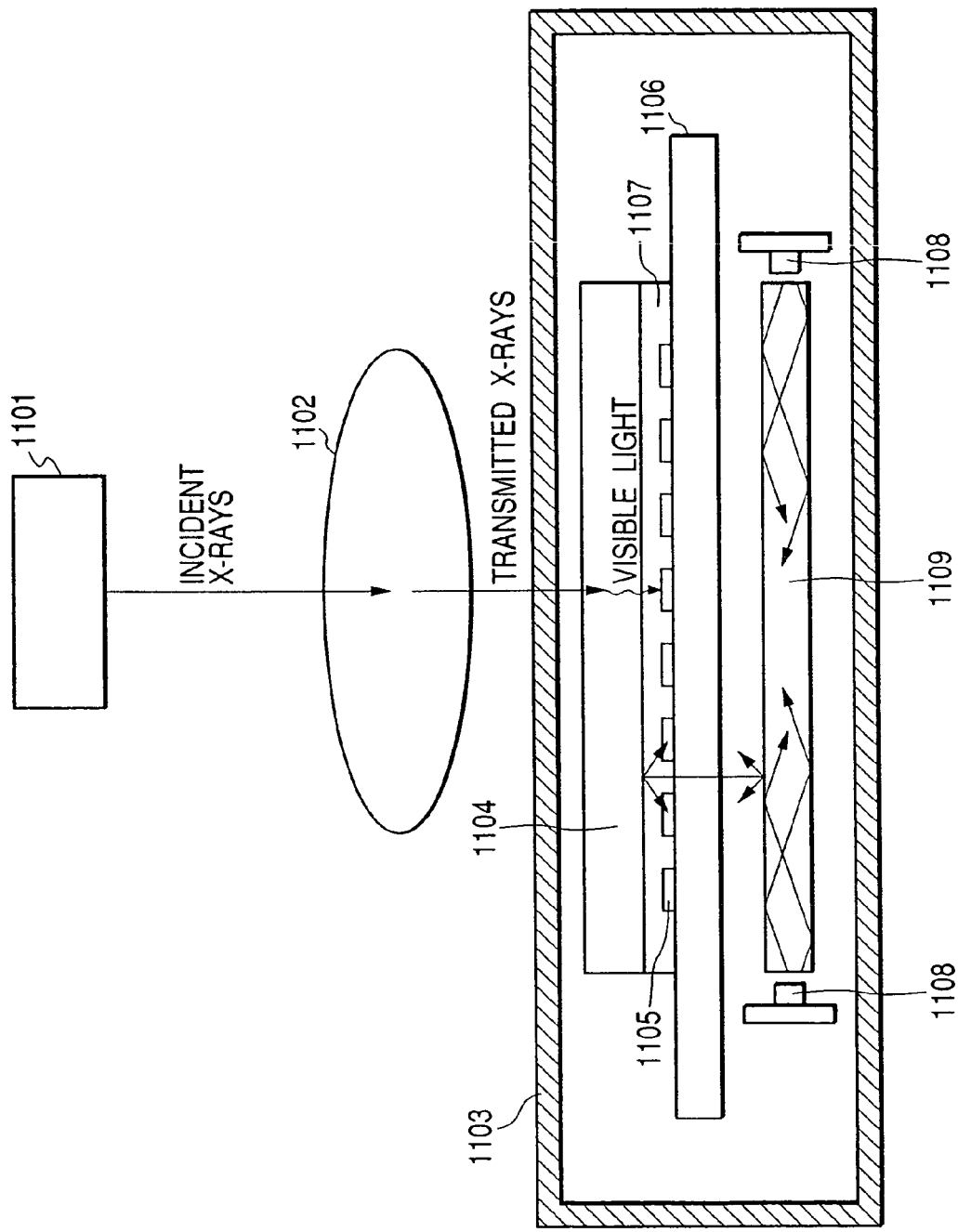
FIG. 11 is a cross-sectional view of a photoelectric conversion device of Embodiment 2 of the present invention.

FIG. 11 is a cross-sectional view showing Embodiment 2 of a photoelectric conversion device according to the present invention. In FIG. 11, the reference numeral 1101 denotes an x-ray source, 1102 an object body to be read out, 1103 a chassis, 1104 a phosphor, 1105 a photoelectric conversion element, 1106 an insulating substrate, 1107 a protective layer, 1108 an LED, and 1109 is a light guide plate.

The different point from the photoelectric conversion device of the Embodiment 1 illustrated in FIG. 1, is that the light guide plate 1109 is installed under the photoelectric conversion substrate (the insulating substrate 1106) and LED 1108 as a second light source provided in the outer casing is arranged on the side face of the light guide plate 1109. The material for the light guide plate to be used is a transparent material such as acrylic resin, glass or the like whose refractivity is different from that of air.

FIG. 11 is a cross-sectional view showing the structure of the photoelectric conversion device, and photoelectric conversion elements are arranged in a two-dimensional state in the depth direction of the sheet face of FIG. 11. The LED is also arranged in a one-dimensional state in the depth direction of the sheet face of FIG. 11. The light rays coming from the side face of the light guide plate 1109 proceed to the inside of the light guide plate. At that time, the light rays proceeding at an angle more acute than the critical angle determined by the refractivity of the light guide plate 1109 and the refractivity of the ambient refractivity are fully reflected in the light guide plate interface and further proceed to the inside. On the other hand, the light rays proceeding at an angle more obtuse than the critical angle are partially refracted and led to the photoelectric conversion substrate side. The radiation of the latter light rays at the time of non-reading-out can lower the dark current within a short time.

Although the upper face and the lower face of the light guide plate 1109 shown in FIG. 11 are drawn like planes, surface roughening processing can improve the diffusion property and the light rays coming out of the photoelectric conversion substrate from the light guide plate are increased. The light rays coming out of the insulating substrate side penetrate the side faces of the photoelectric conversion elements 1105, are reflected by the phosphor 1104 faces and reach the light-receiving faces of photoelectric conversion elements 1105. The photoelectric conversion device of this embodiment is made capable of shortening the waiting time without requiring installation of a second light source such as a large quantity of LEDs and without increasing the power consumption.

Embodiment 3

Figure 12:
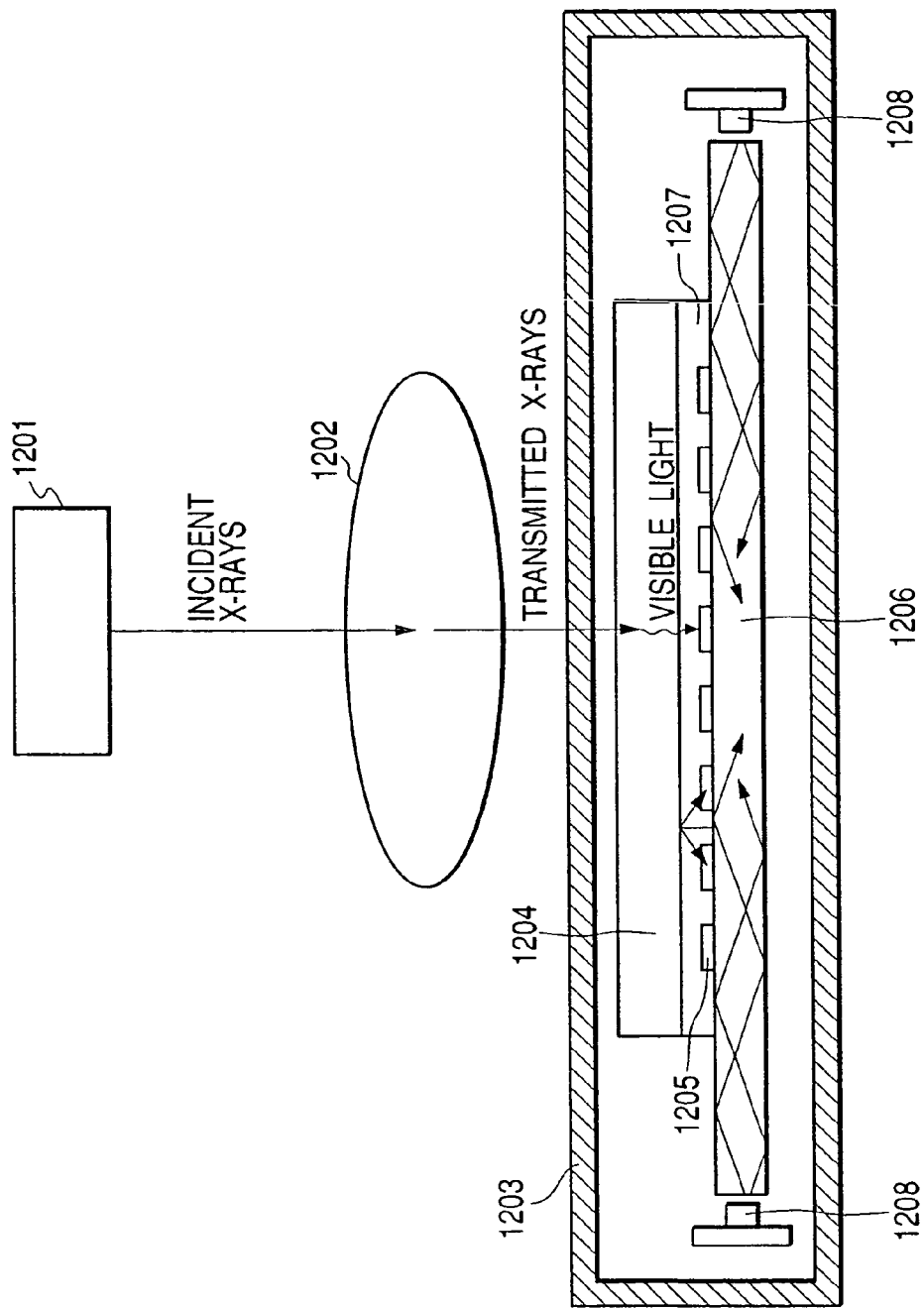
FIG. 12 is a cross-sectional view of a photoelectric conversion device of Embodiment 3 of the present invention.

FIG. 12 is a cross-sectional view showing Embodiment 3 of a photoelectric conversion device according to the present invention. In the figure, the reference numeral 1201 denotes an x-ray source, 1202 an object body to be read out, 1203 a chassis, 1204 a phosphor, 1205 a photoelectric conversion element, 1206 an insulating substrate working also as a light guide plate, 1207 a protective layer, and 1208 an LED.

In this embodiment, the insulating substrate in which the photoelectric conversion elements 1205 are arranged is used also as a light guide plate. The material for the insulating substrate working also as the light guide plate 1206 is a transparent material such as acrylic resin, glass or the like whose refractivity is different from that of air. FIG. 12 is a cross-sectional view showing the structure of the photoelectric conversion device and photoelectric conversion elements 1205 are arranged in a two-dimensional state in the depth direction of the sheet face of FIG. 12. As the second light source installed in the outer casing, the LED 1208 is also arranged in a one-dimensional state in the depth direction of the sheet face of FIG. 12.

In FIG. 12, the light rays coming from the side face of the insulating substrate also working as a light guide plate 1206 proceed to the inside. At that time, the light rays proceeding at an angle more acute than the critical angle determined by the refractivity of the insulating substrate also working as a light guide plate 1206 and the refractivity of the ambient refractivity are fully reflected in the lower face of the insulating substrate also working as a light guide plate 1206 and further proceed to the inside. On the other hand, the light rays proceeding at an angle more obtuse than the critical angle are partially refracted and led to the photoelectric conversion substrate side. If the light rays are radiated to the photoelectric conversion element at the time of non-reading-out, the dark current can be lowered within a short time. Although the lower face of the insulating substrate also working as a light guide plate 1206 shown in FIG. 12 may be a flat face, if it is surface-roughened, the diffusion property is increased and the light rays coming to the side of the phosphor 1204 from the side of the insulating substrate also working as a light guide plate 1206 are increased. The light rays coming to the side of the phosphor 1204 penetrate the side faces of the photoelectric conversion elements 1205, are reflected by the phosphor faces and reach the light-receiving faces of photoelectric conversion elements 1205. On the other hand, in the upper face of the insulating substrate also working as a light guide plate 1206, the light rays coming into collision with the first metal thin film layer of the photoelectric conversion elements 1205 (and the switching elements) are reflected at a high ratio. Also, the light rays coming into collision with the protective layer 1207 other than the first metal thin film layer are reflected or refracted depending on the light proceeding conditions determined by the refractivity of the protective layer 1207 and the refractivity of the insulating substrate also working as a light guide plate 1206.

The photoelectric conversion device of this embodiment is made capable of shortening the waiting time without requiring installation of the second light sources such as a large quantity of LEDs and without increasing the power consumption. Further, the photoelectric conversion device can be light in weight and compact in size since the insulating substrate is used also as a light guide plate.

Embodiment 4

Figure 13:
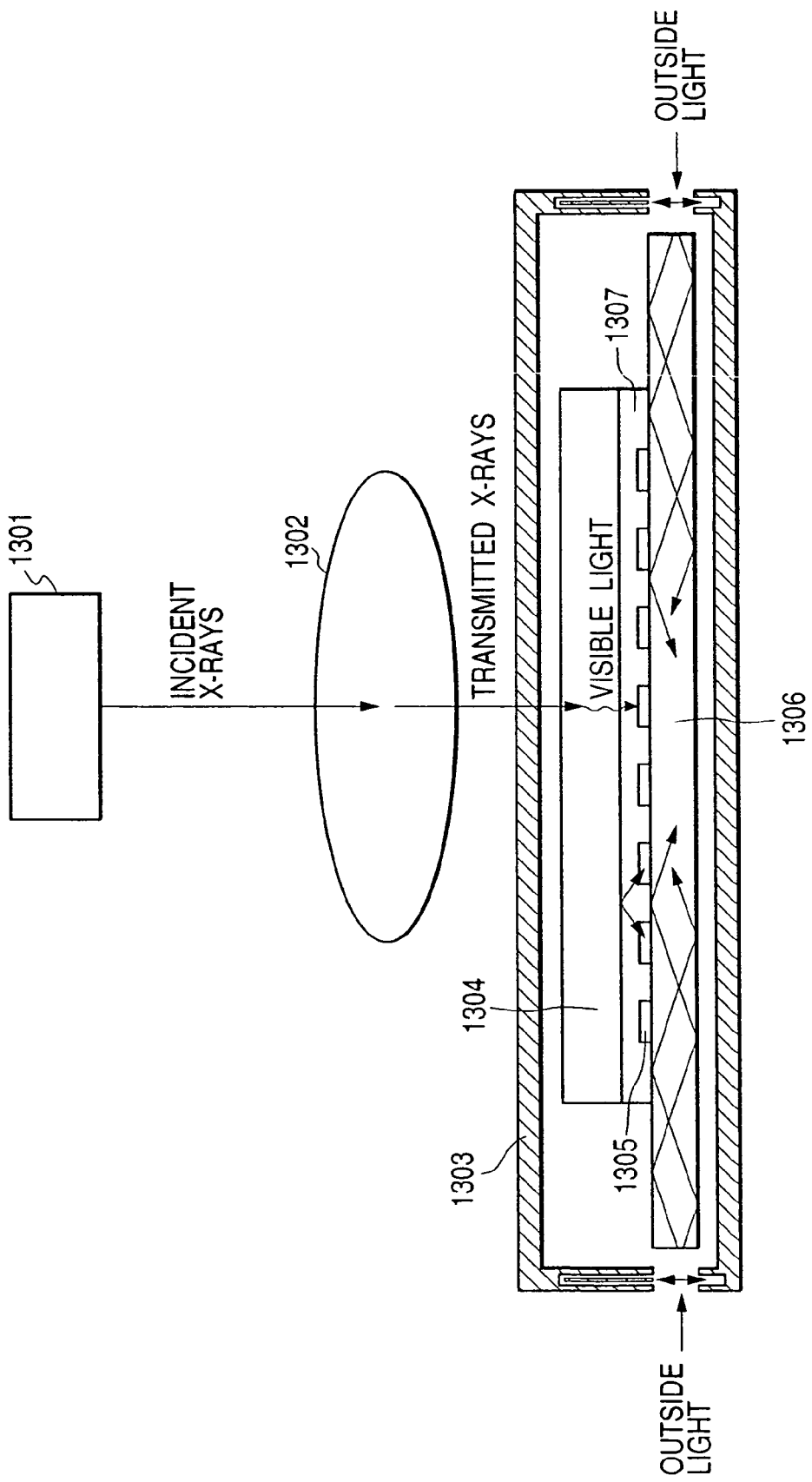
FIG. 13 is a cross-sectional view of a photoelectric conversion device of Embodiment 4 of the present invention.

FIG. 13 is a cross-sectional view showing Embodiment 4 of a photoelectric conversion device according to the present invention. In FIG. 13, the reference numeral 1301 denotes an x-ray source, 1302 an object body to be read out, 1303 a chassis, 1304 a phosphor, 1305 a photoelectric conversion element, 1306 an insulating substrate working also as a light guide plate, and 1307 a protective layer.

In this embodiment, a plurality of light sources are not particularly installed and external light is used in place of a light source in the outer casing. The outer casing is opened when the external light is taken in the light guide plate side and closed during the time other than that. The opening and closing may automatically be controlled by a motor. Since no space is required for installation of any light source in the outer casing, the apparatus can be miniaturized. Further, by properly selecting the motor, the electric power consumption can also be reduced. This embodiment is especially effective in the case where the external light quantity is intense.

Embodiment 5

Figure 14:
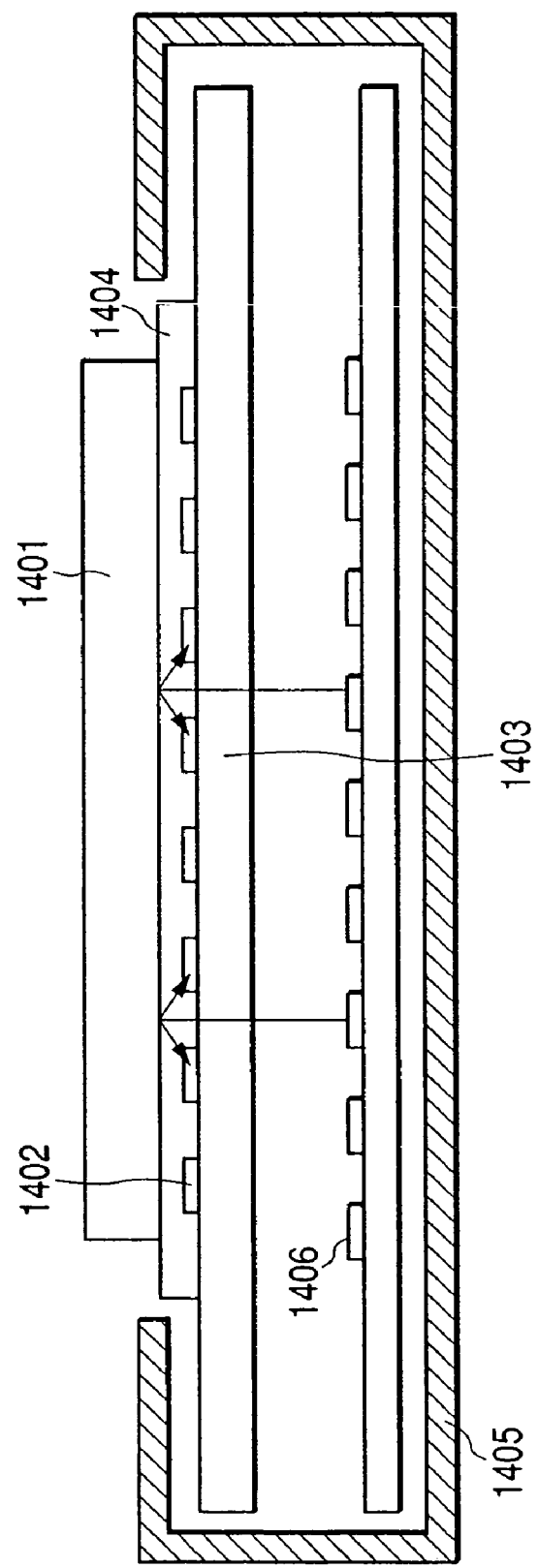
FIG. 14 is a cross-sectional view of a photoelectric conversion device of Embodiment 5 of the present invention.

FIG. 14 is a cross-sectional view showing Embodiment 5 of a photoelectric conversion device according to the present invention. In FIG. 14, the reference numeral 1401 denotes an original document, 1402 a photoelectric conversion element, 1403 an insulating substrate, 1404 a protective layer, 1405 a chassis, and 1406 an LED.

The photoelectric conversion device according to this embodiment is a mode adapted to a copier or a facsimile reading an original document.

FIG. 14 is a cross-sectional view showing the structure of the photoelectric conversion device, and photoelectric conversion elements 1402 and LED 1406 are arranged in a two-dimensional state in the depth direction of the sheet face of FIG. 14. Further, although they are not shown in FIG. 1 of Embodiment 1, the photoelectric conversion elements 1402 and switching elements may be arranged in pairs on the insulating substrate 1403.

The light rays (visible light rays) emitted out of the LED 1406 arranged under the insulating substrate 1403 are transmitted through the insulating substrate 1403, pass the side faces of the photoelectric conversion elements 1402, and reach the original document 1401, which is an object to be read out. Corresponding to the densities of the letters and the images drawn on the surface of the original document, the light rays are reflected by the original document face and radiated to the light-receiving faces of the photoelectric conversion elements 1402.

The LEDs are turned on during both the reading-out periods and the non-reading-out periods. The lighting of the LED 1406 during the reading-out period is to read out the data of the original document by photoelectric conversion elements 1402. By lighting the LED during image-pickup and during the non-reading-out period, the dark current can be decreased during the reading-out period. Regarding the lighting of the LED during the non-reading-out period, the original document 1401 may be put or may not be put on the upper part of the photoelectric conversion elements and it is sufficient for some quantity of light rays to reach the light-receiving faces of the photoelectric conversion elements 1402.

Depending on the raw materials of the original document itself or the ink, the original document has different reflective properties to light rays from the LED and any is acceptable unless it completely absorbs light rays and it is sufficient for the original document to reflect several % of light rays so as to reach the photoelectric conversion elements. Since there practically exist light rays coming from the diagonal direction, if components reflected by the mirror face of the original document face are included in the reflected light rays, the original document can never entirely absorb light rays. Further, in the case where no original document exists, the components of the light rays in the perpendicular direction from the LED do not reach the photoelectric conversion elements at a high ratio and since the refractivity of the protective layer and the refractivity of the ambient air differ from each other, the light rays from the diagonal direction from the LED and the light rays scattered by the edge parts of the metal thin film layers of the photoelectric conversion elements and the switching elements and emitted in the diagonal direction are partly reflected to the photoelectric conversion element side by the protective layer interface.

Embodiment 6

Figure 15:
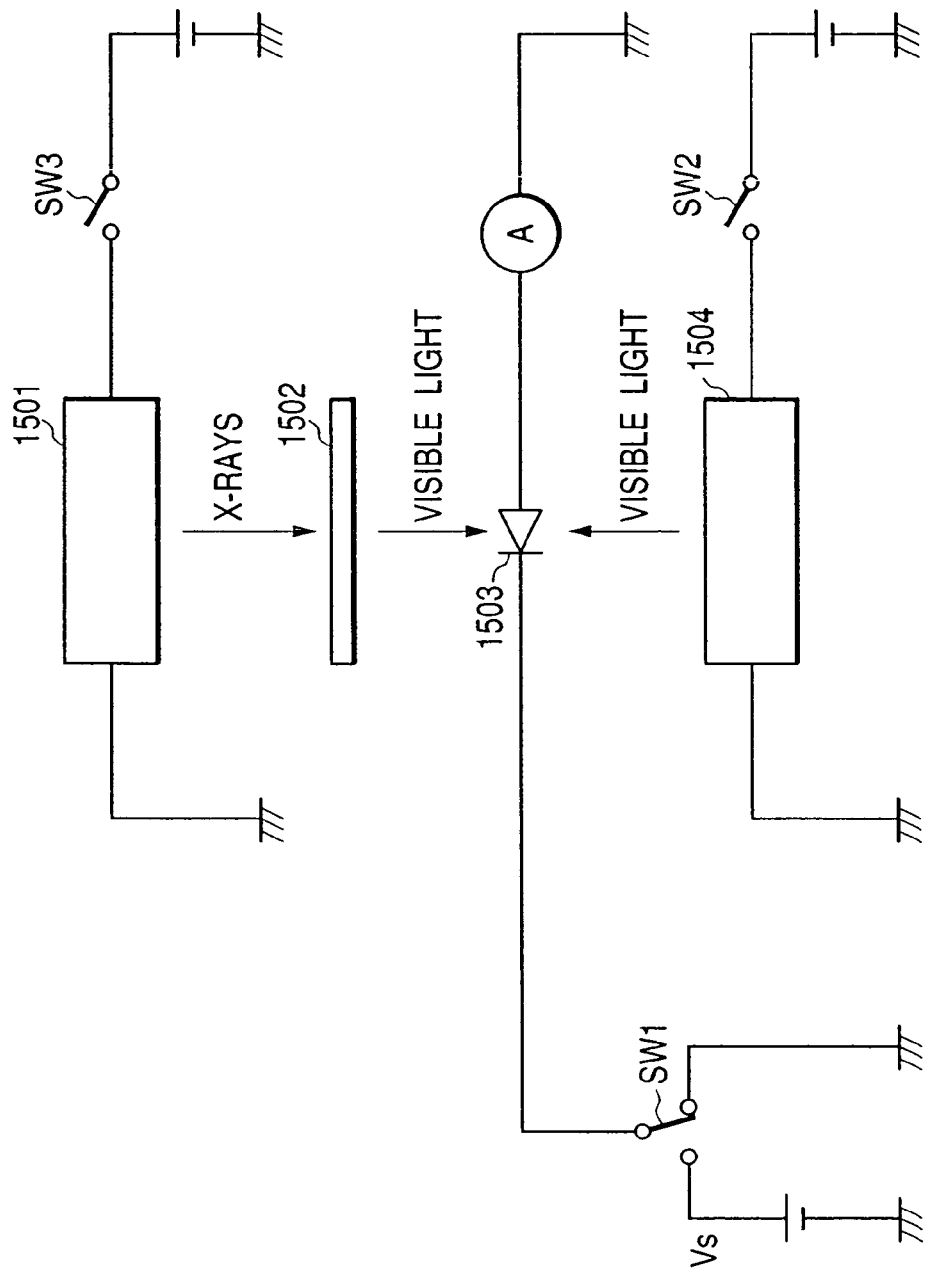
FIG. 15 is a cross-sectional view of a photoelectric conversion element of Embodiment 6 of the present invention.

FIG. 15 is a circuit diagram of a photoelectric conversion element as one pixel showing Embodiment 6 according to the present invention.

A photoelectric conversion element 1503 shows a PIN type photo diode, and usable as a material is possibly amorphous silicon, crystalline silicon, or the like.

The cathode side of the diode of a photoelectric conversion element 1503 is connected with an SW1 and the anode side is connected with an ammeter. The other side of the SW1 is made switchable to be connected either with a power source (Vs) for applying bias to the photoelectric conversion element or a zero bias (GND). The x-rays radiated from an x-ray source 1501, which is a first light source, are radiated to an object body to be inspected (a patient in the case of a hospital), which is not shown in FIG. 15, and the x-rays transmitted through the object come into collision with a phosphor 1502 which is an x-ray wavelength converter. The x-rays are converted to visible light rays by the phosphor 1502. The visible light rays from the phosphor 1502 are radiated to a photoelectric conversion element 503.

Since the circuit diagram of the photoelectric conversion element of this embodiment shown in FIG. 15 shows a circuit diagram only for one pixel, the positioning correlation between the photoelectric conversion elements and the phosphor is therefore not illustrated. However, similarly as in Embodiment 1 illustrated in FIG. 1, the image resolution property is improved by practically closely attaching both of them to each other. On the other hand, the visible light rays from the LED light source 1504, which is a second light source, are radiated to the photoelectric conversion elements 1503 through another optical path different from that for the x-rays. SW2 and SW3 are switches for turning on the x-ray source 1501 and the LED light source 1504, respectively.

Figure 16:
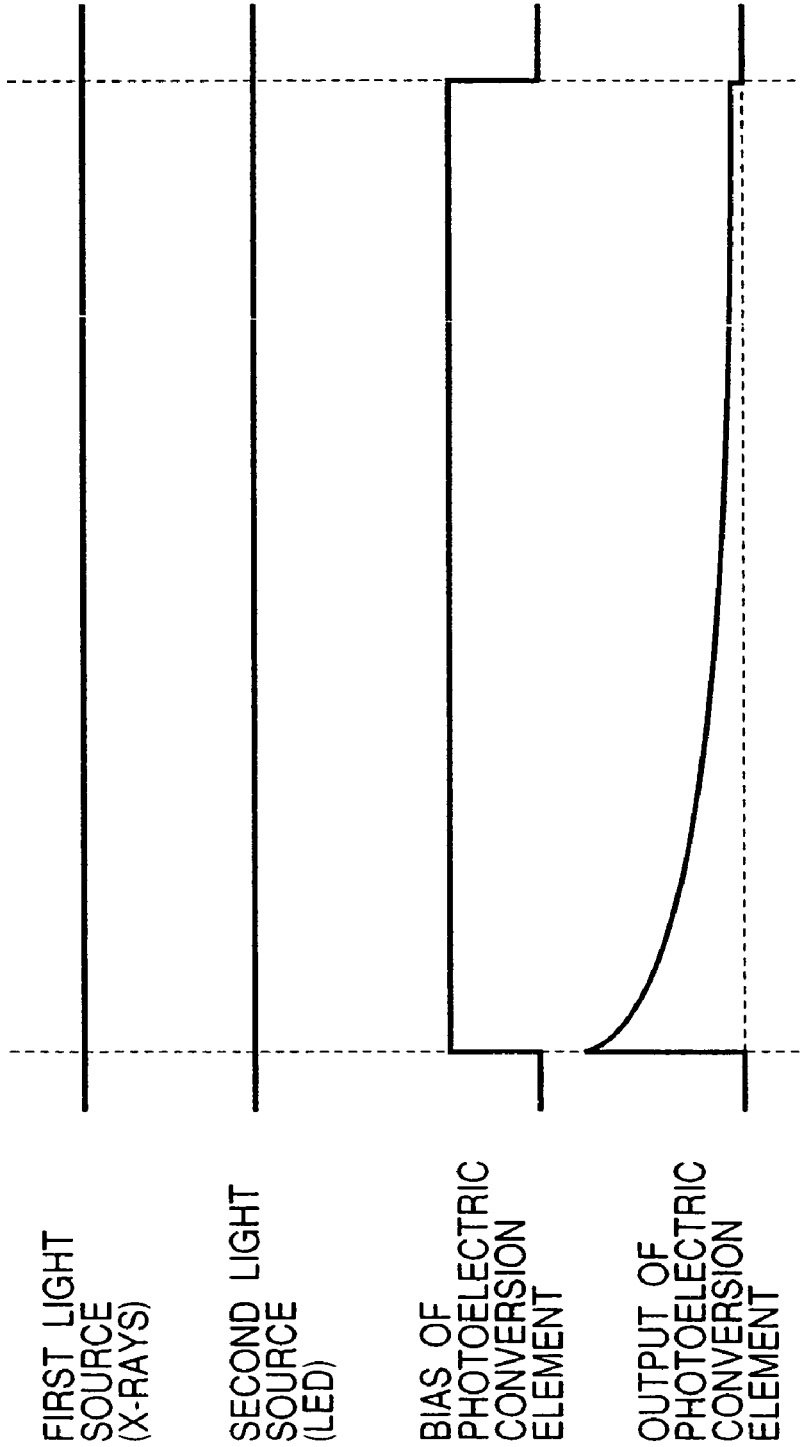
FIG. 16 is a timing chart (1) of the circuit illustrated in FIG. 15.
Figure 18:
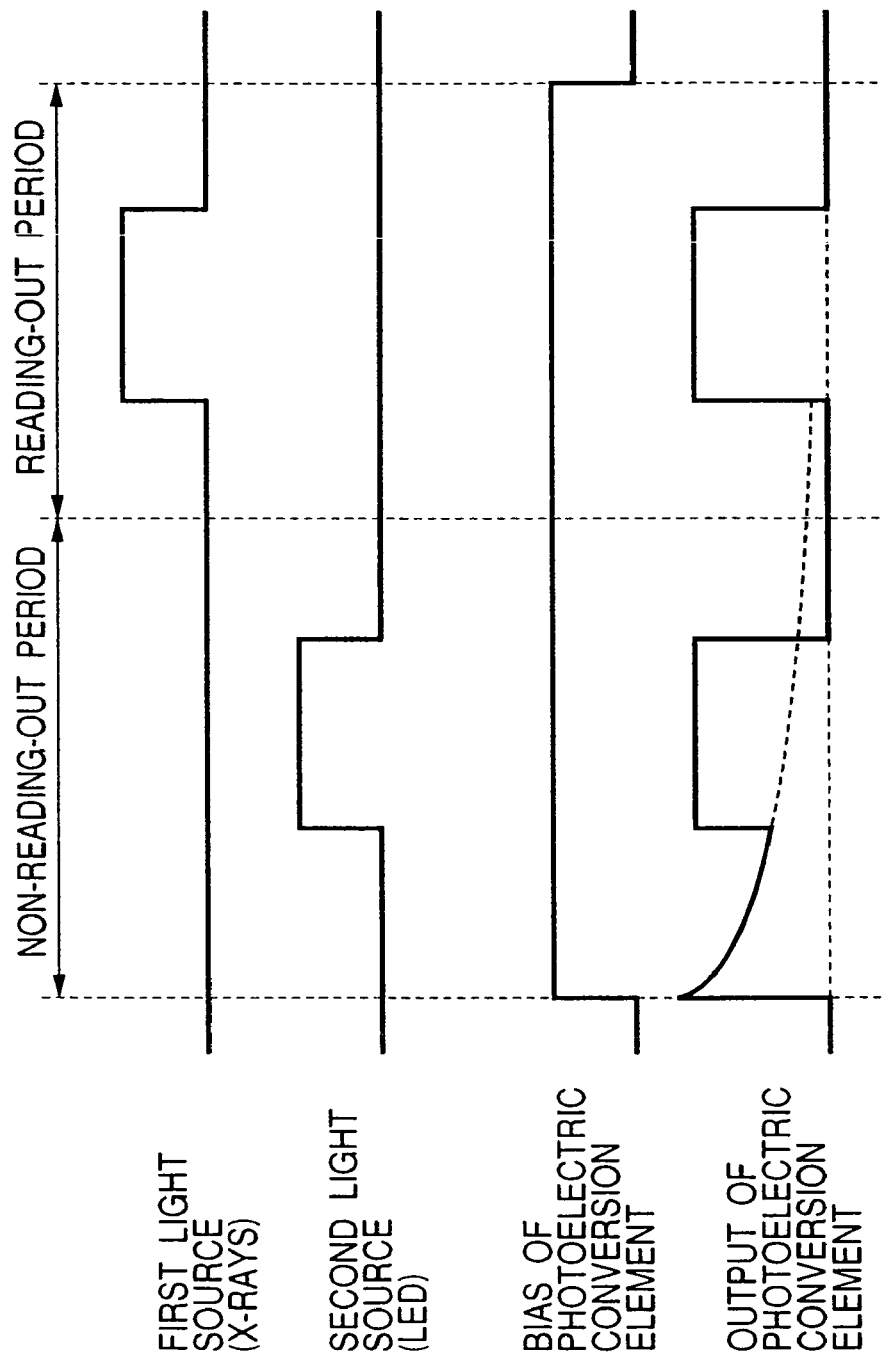
FIG. 18 is a timing chart (3) of the circuit illustrated in FIG. 15.

FIG. 16 is a timing chart of operation in the circuit of this embodiment shown in FIG. 15 and shows the x-ray source, the LED light source, bias of the photoelectric conversion element, and the output of the photoelectric conversion elements. In FIG. 18, the x-ray source and the LED are not to be lighted in order to show the state of dark output (the dark current) of the photoelectric conversion element.

In the FIG. 18, when bias is applied to the photoelectric conversion element, the dark current flows in the photoelectric conversion element. It is preferable for the dark current to be ideally zero; however, it is difficult to be zero. Further, constant electric current does not flow simultaneously with the time when the electric power source is turned on, but the dark current is high immediately after the turning-on and gradually decays with the lapse of time.

Generally even in the case where the photoelectric conversion elements are fabricated using the PIN photodiode containing mainly an amorphous silicon semiconductor as a material, the dark current flows as described above.

Additionally, the blocking properties of a p-layer and an n-layer are not perfect and it is supposed that components for dark current are increased owing to the carriers flowing in the inside of an i-layer from the outside.

Further, in the case of using a crystal type PIN-type photodiode without using an amorphous semiconductor film, it is said that the trap levels are not so many as compared with those in the case of using an amorphous semiconductor, although it depends on the process conditions and the apparatus to be fabricated. However, many crystal lattices are mismatched in the interface part between the p-layer and the i-layer and in the interface part between the i-layer and the n-layer, the trap levels are not zero, and there is a tendency of the output of the photoelectric conversion elements to be as shown in FIG. 16.

A signal with a high S/N ratio can be obtained by waiting until the dark output (dark current) of the photoelectric conversion elements is sufficiently decayed. However, it takes as long as several seconds to several ten seconds to decay the dark current to an aimed dark output level. In this case, for example, when the photoelectric conversion elements are employed for an x-ray imaging apparatus to be used in a hospital, the following procedure is required: a patient is guided to a photographing chamber, the photoelectric conversion elements are turned on, and after waiting for several to several ten seconds, the patient is subjected to x-ray exposure. Although it is better to turn on the electric power source for the photoelectric conversion elements before a patient comes in the photographing chamber, in that case, deterioration (property change, corrosion, or the like) of the photoelectric conversion elements is accelerated making it difficult to provide an apparatus with a long life.

Figure 17:
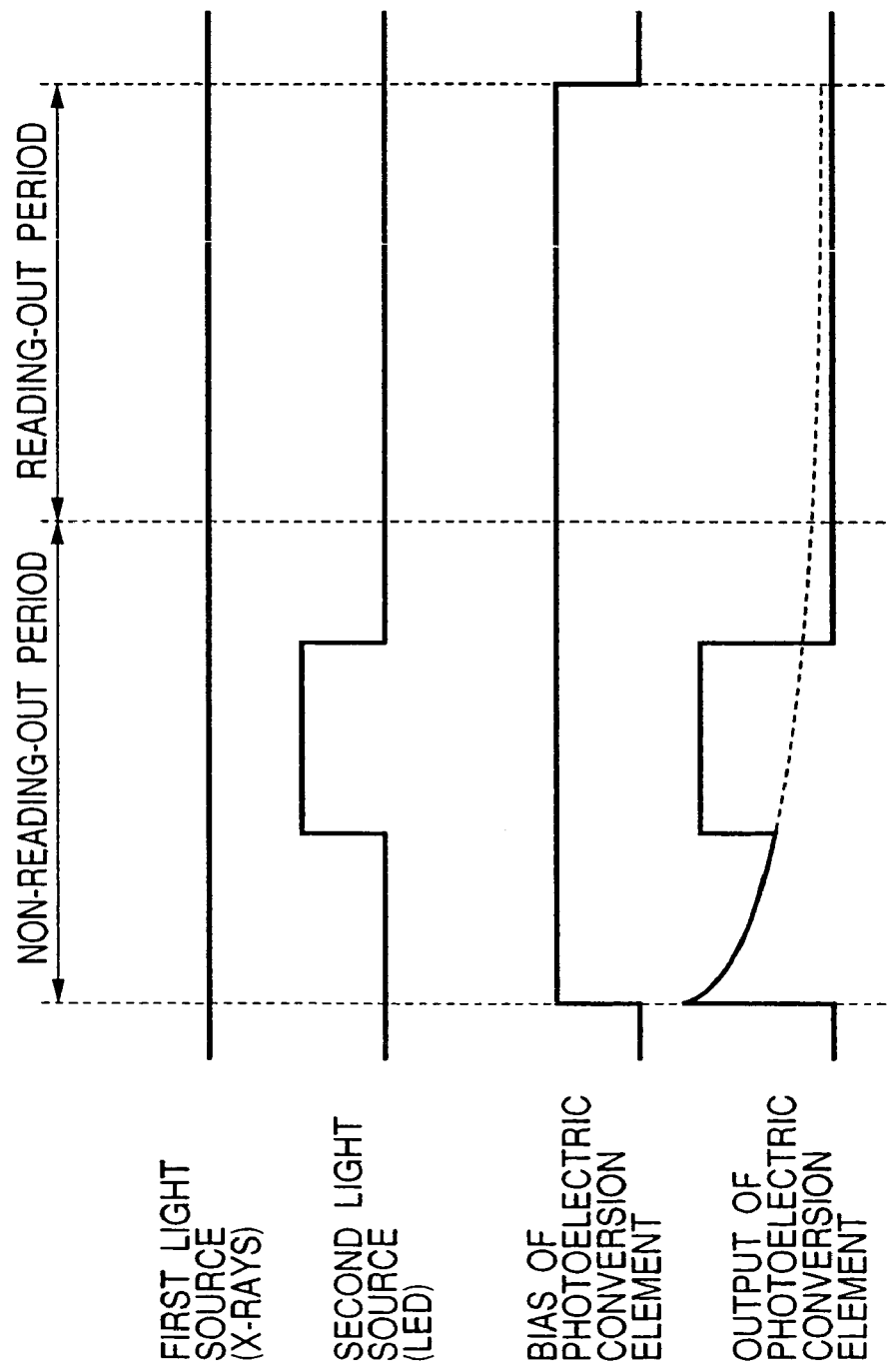
FIG. 17 is a timing chart (2) of the circuit illustrated in FIG. 15.

FIG. 17 is a timing chart of the operation in the circuit of this embodiment illustrated in FIG. 15 and shows the case of lighting the LED light source after the electric power source of the photoelectric conversion elements is turned on.

By turning on the LED, photocurrent flows in the photodiode and finally, simultaneously with the time when the LED is turned off, the photocurrent is stopped. At that time, the dark current after the turning off of the LED is stabilized with the lapse of time or in some cases lowered as compared with that in the case where the LED is not turned on (in the timing chart of FIG. 16). That is because the inner state (especially in the interface part) of a semiconductor layer is stabilized by excess carriers generated in the inside of the semiconductor layer by the photoenergy radiated by the LED, and either electrons or holes are released by the light radiation. If x-rays are radiated in such a low dark current state, signals with a high S/N ratio can be obtained.

In other words, an x-ray image with a high S/N ratio can be obtained without taking a long waiting time by lowering the dark current by radiating LED light before x-ray photography.

FIG. 18 is a timing chart showing the output situation of the photoelectric conversion elements when x-rays are turned on after the LED is turned on.

The LED is previously turned on in order to lower the dark current of the photoelectric conversion elements at the time when x-ray exposure is to be carried out within a short time. The photocurrent flowing at that time has nothing to do with the reading out of the image data. The period during which the LED is turned on is called as the non-reading-out period. On the other hand, x-rays are radiated only for reading-out the internal data of a patient. The period during which x-rays are radiated is called as the reading-out period. The light rays of the LED (the second light source) are radiated during the non-reading-out period, and x-rays (the first light source) are radiated during the reading-out period. The duration of the non-reading-out period and the reading-out period or the radiation duration of the LED may be determined depending on the properties of the dark output (the dark current) of the photoelectric conversion elements and the S/N ratio required for the photoelectric conversion device.

Embodiment 7

Figure 19:
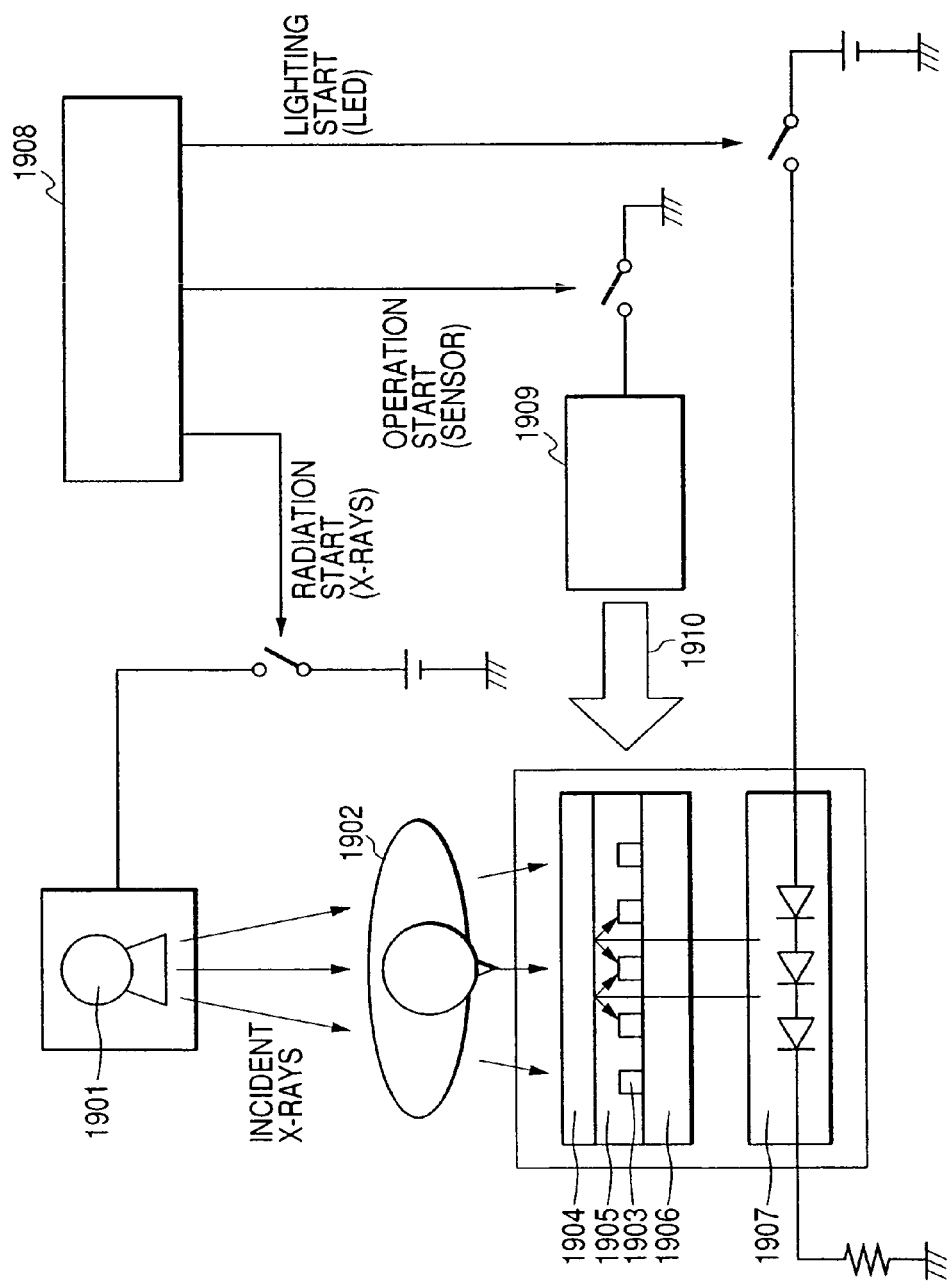
FIG. 19 is a block diagram of a photoelectric conversion device of Embodiment 7 of the present invention.

FIG. 19 is a block diagram of a photoelectric conversion device of Embodiment 7 according to the present invention. In the block diagram of FIG. 19, illustrated is the schematic diagram of an image processing system using an x-ray imaging apparatus to be employed in a hospital. In FIG. 19, the reference numeral 1901 denotes an x-ray source, 1902 a patient, 1903 a photoelectric conversion element, 1904 an x-ray-visible light converting phosphor, 1905 a protective layer, 1906 a substrate, 1907 an LED, 1908 control means, 1909 a timing generation apparatus, and 1910 a plurality of driving signals.

In FIG. 19, radiation, for example, x-rays radiated from an x-ray source are radiated to the patient 1902 and the x-rays transmitted through the patient reach the x-ray imaging (image-pickup) apparatus. The x-rays are converted to visible light rays by the phosphor which is a wavelength converter, and the visible light rays are radiated to the photoelectric conversion elements 1903. The visible light rays contain the image data of the patient 1902. The photoelectric conversion elements 1903 and the wavelength converter are practically closely attached to each other and in FIG. 19, they are closely attached through the thin protective film 1905. Further, the photoelectric conversion elements 1903 are installed on the substrate 1906. A light source is installed on a side opposite to the light-receiving face side of the photoelectric conversion elements 1903 on the substrate 1906. In this case, the LED is used as the light source. The light rays from the LED 1907 are transmitted through the substrate 1906 and reflected by the wavelength converter and then reach the photoelectric conversion elements 1903.

The radiation (switching on) of x-rays and lighting (switching on) of the LED light source and switching off are controlled by control means.

In FIG. 19, although only the photoelectric conversion elements are illustrated, a switching element may be installed just like the 2-dimensional circuit diagram as shown in FIG. 8. Further, in FIG. 19, although only the photoelectric conversion elements installed on the substrate are illustrated, the photoelectric conversion circuit part 801 and the circuit part for reading-out 807 as shown in FIG. 8 are installed as well. The photoelectric conversion circuit 801 and the circuit part for reading-out 807 are operated by signals based on the timing chart shown in FIG. 10. These signals are VSC, REF, CRES, G1, G2, G3, SMPL, Sr1, Sr2, Sr3 or the like. They are outputted by a timing generation apparatus and inputted to the photoelectric conversion device (801 and 807 shown in FIG. 8). In other words, the signals from the timing generation apparatus operate the photoelectric conversion device. As shown in FIG. 19, the timing generation circuit is controlled (ON/OFF) by the control means. As an example of constitution of the control means, a computer is available. The control means independently controls the x-ray source, the photoelectric conversion device, and the LED which is a second light source, and if a computer is employed for the control means, the control method can be programmed using software. That is, the handling convenience can be improved and consequently, the added value to the x-ray imaging apparatus to be used in a hospital is increased.

Further, also possible is a method which comprises installing the A/D conversion circuit part 805 shown in FIG. 8, which is not shown in FIG. 19, in the periphery of the photoelectric conversion circuit part 801 and the circuit part for reading-out 807, and storing the digital data of the A/D conversion circuit part 805 in the memory of the computer (the control means).

What is claimed is:

1. A radiation detection apparatus comprising:
    a plurality of photoelectric conversion elements arranged on a first surface of an insulating substrate;
    a light source for emitting a light, its wavelength including a wavelength region of light absorption of the photoelectric conversion elements; and
    an outer casing that houses the photoelectric conversion elements and the light source;
    wherein the light can be transmitted through the insulating substrate, and
    wherein the light source is arranged between a second surface opposed to the first surface of the insulating substrate and the outer casing.

2. The radiation detection apparatus according to claim 1, further comprising a light guide plate.

3. The radiation detection apparatus according to claim 2, wherein the light source provided in the outer casing is arranged on the side face of the light guide plate.

4. The radiation detection apparatus according to claim 1, wherein the photoelectric conversion elements are arranged on the insulating substrate, and the insulating substrate is also used as a light guide plate.

5. The radiation detection apparatus according to claim 1, wherein the light source is arranged in a space outside of a region above or below a region of the insulating substrate where the photoelectric conversion elements are formed.

6. The radiation detection apparatus according to claim 1, wherein the photoelectric conversion device further comprises a wavelength converter for converting radiation radiated from a radiation source to light, and the light source is arranged in a space outside of a region above or below a region where the wavelength converter is formed.

7. An image data processing system, comprising:
    the radiation detection apparatus according to claim 1;
    a radiation source; and
    control means for independently controlling the radiation source, the light source and the photoelectric conversion device.

* * * * *